(12) United States Patent
Yamamoto et al.

(10) Patent No.: US 7,576,903 B2
(45) Date of Patent: Aug. 18, 2009

(54) MICROCAPSULE, METHOD OF MANUFACTURING MICROCAPSULE, ELECTROPHORETIC DEVICE, AND ELECTRIC APPARATUS

(75) Inventors: Hitoshi Yamamoto, Chino (JP); Takeo Kawase, Suwa (JP); Toshiyuki Miyabayashi, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 396 days.

(21) Appl. No.: 11/379,324

(22) Filed: Apr. 19, 2006

(65) Prior Publication Data
US 2006/0234053 A1   Oct. 19, 2006

(30) Foreign Application Priority Data
Apr. 19, 2005   (JP)   ............................. 2005-121760
Apr. 20, 2005   (JP)   ............................. 2005-123019
Apr. 5, 2006    (JP)   ............................. 2006-104581

(51) Int. Cl.
   *G02F 1/01*   (2006.01)
(52) U.S. Cl. ..................... 359/296; 428/402; 345/107
(58) Field of Classification Search ................ 359/296; 428/402–402.24; 345/107
   See application file for complete search history.

(56) References Cited
U.S. PATENT DOCUMENTS 4,268,456 A   5/1981   Keim et al.
4,320,070 A   3/1982   Cook et al.
5,827,531 A * 10/1998  Morrison et al. ........ 428/402.21
6,528,035 B1 * 3/2003  Mathiowitz et al. ......... 423/407
6,844,958 B2 * 1/2005  Kawai .......................... 359/296
2006/0245037 A1* 11/2006 Yamamoto et al. .......... 359/296

FOREIGN PATENT DOCUMENTS

| JP | 46-34898 B   | 10/1971 |
| JP | 49-46291 B   | 12/1974 |
| JP | 51-30284 A   | 3/1976  |
| JP | 55-011525 A  | 1/1980  |
| JP | 62-034947 A  | 2/1987  |
| JP | 62-104802 A  | 5/1987  |
| JP | 62-221431 A  | 9/1987  |
| JP | 64-086116 B2 | 3/1989  |
| JP | 1-24142 B2   | 5/1989  |
| JP | 4-65824 B2   | 10/1992 |
| JP | 5-320276 A   | 12/1993 |
| JP | 2551783 B    | 8/1996  |
| JP | 10-316909 A  | 12/1998 |

* cited by examiner

*Primary Examiner*—Evelyn A. Lester
(74) *Attorney, Agent, or Firm*—Oliff & Berridge, PLC

(57) ABSTRACT

A microcapsule includes an electrophoretic dispersion liquid containing at least one kind of electrophoretic particles and a capsule body, which has a first film containing the electrophoretic dispersion liquid and a second film made of organic polymer having a hydrophobic property higher than the material of the first film.

23 Claims, 14 Drawing Sheets

MICROCAPSULE, METHOD OF MANUFACTURING MICROCAPSULE, ELECTROPHORETIC DEVICE, AND ELECTRIC APPARATUS

BACKGROUND

1. Technical Field

The present invention relates a microcapsule, a method of manufacturing a microcapsule, an electrophoretic device, and an electric apparatus.

2. Related Art

Generally, when an electric field is applied to a dispersion system in which particles are dispersed in a dispersion medium, there has been known that the particles moves (migrates) in the dispersion medium by a Coulomb force. This phenomenon is referred to as "electrophoresis and electrophoretic devices for displaying desired information (images) by the use of the electrophoresis attracted attentions as a new display device in recent years.

The electrophoretic devices have a display memory property and a wide viewing angle when the application of a voltage is stopped and also have a feature that a display of high contrast with low power consumption is possible.

Since the electrophoretic devices are a light non-emitting device, they are convenient to eyes in comparison with light emitting display devices such as a cathode ray tube.

As such an electrophoretic device, there is known a microcapsule type that a plurality of microcapsules enclosing an electrophoretic dispersion liquid in which electrophoretic particles are dispersed and a binder material for fixing the microcapsules to a pair of substrates having an electrode are interposed between both substrates (for example, see Japanese Patent No. 2,551,783).

Generally, a coacervation method using gelatin and gum Arabic is used for the micro-encapsulation of the electrophoretic dispersion liquid.

However, the electrophoretic device using the microcapsules has a problem that the amount of moisture in the electrophoretic dispersion liquid is increased and thus the electrophoretic device does not operate, at the time of a moisture-resistance test for 24 hours under the condition of 80° C. and 90% RH.

SUMMARY

An advantage of the present invention is to provide a microcapsule having excellent weather resistance and mechanical strength, a method of manufacturing the microcapsule, and an electrophoretic device and an electric apparatus having the microcapsule with high reliability.

The above-mentioned advantage can be accomplished by Aspects 1 to 29 described below.

1. A microcapsule comprising: an electrophoretic dispersion liquid containing at least one kind of electrophoretic particles, and a capsule body having a first film containing the electrophoretic dispersion liquid and a second film made of organic polymer having a hydrophobic property higher than the material of the first film.

2. The microcapsule according to Aspect 1, wherein the first film has electric charges on the outer surface thereof, the second film has electric charges on both the inner surface and the outer surface, and the electric charges on the inner surface of the second film have a polarity opposite to that of the electric charges on the outer surface of the first film.

3. The microcapsule according to Aspect 2, wherein the second film has a repeated structure unit derived from a polymerization surface-active agent having a polar group having a polarity opposite to that of the electric charges on the outer surface of the first film, a hydrophobic group, and a polymerization group.

4. The microcapsule according to Aspect 3, wherein the electric charges on the outer surface of the first film are minus charges, the polar group of the polymerization surface-active agent is a cationic group, and the cationic group is one selected from a group consisting of a first-degree amine cationic group, a second-degree amine cationic group, a third-degree amine cationic group, and a fourth-degree ammonium cationic group.

5. The microcapsule according to Aspect 3, wherein the anionic group is one selected from a group consisting of a sulfonate anionic group ($-SO_3^-$), a sulfinate anionic group ($-RSO_2^-$, examples of which include an alkyl group, a phenyl group, and degenerative materials thereof having a carbon number of 1 to 12), and a carbonic anionic group ($-COO^-$).

6. The microcapsule according to any one of Aspects 3 to 5, wherein the hydrophobic group of the polymerization surface-active agent includes at least one of an alkyl group and an aryl group.

7. The microcapsule according to any one of Aspects 3 to 6, wherein the polymerization group of the polymerization surface-active agent is a radical-polymerizable unsaturated hydrocarbon group.

8. The microcapsule according to Aspect 7, wherein the radical-polymerizable unsaturated hydrocarbon group is one selected from a group consisting of a vinyl group, an aryl group, an acryloyl group, a methacryloyl group, a propenyl group, a vinylidene group, and a vinylene group.

9. The microcapsule according to any one of Aspects 3 to 8, wherein the second film has a repeated structure unit derived from a second polymerization surface-active agent having a polar group having a polarity equal to that of the electric charges on the outer surface of the first film, a hydrophobic group, and a polymerization group.

10. The microcapsule according to Aspect 9, wherein the electric charges on the outer surface of the first film are plus charges, the polar group of the second polymerization surface-active agent is an anionic group, and the anionic group is one selected from a group consisting of a sulfonate anionic group ($-SO_3^-$), a sulfinate anionic group ($-RSO_2^-$, examples of which include an alkyl group, a phenyl group, and degenerative materials thereof having a carbon number of 1 to 12), and a carbonic anionic group ($-COO^-$).

11. The microcapsule according to Aspect 9, wherein the electric charges on the outer surface of the first film are plus charges, the polar group of the polymerization surface-active agent is a cationic group, and the cationic group is one selected from a group consisting of a first-degree amine cationic group, a second-degree amine cationic group, a third-degree amine cationic group, and a fourth-degree ammonium cationic group.

12. The microcapsule according to any one of Aspects 9 to 11, wherein the hydrophobic group of the second polymerization surface-active agent includes at least one of an alkyl group and an aryl group.

13. The microcapsule according to any one of Aspects 9 to 12, wherein the polymerization group of the second polymerization surface-active agent is a radical-polymerizable unsaturated hydrocarbon group.

14. The microcapsule according to Aspect 13, wherein the radical-polymerizable unsaturated hydrocarbon group is one selected from a group consisting of a vinyl group, an aryl group, an acryloyl group, a methacryloyl group, a propenyl group, a vinylidene group, and a vinylene group.

15. The microcapsule according to any one of Aspects 3 to 14, wherein the second film has a repeated structure unit derived from a hydrophobic monomer.

16. The microcapsule according to any one of Aspects 3 to 15, wherein the second film has a repeated structure unit derived from a cross-linking monomer and/or a repeated structure unit derived from a monomer expressed by General Formula 1:

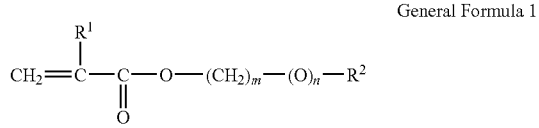

General Formula 1 where $R^1$ denotes a hydrogen atom or a methyl group, $R^2$ denotes a t-butyl group, an alicyclic hydrocarbon group, an aromatic hydrocarbon group, or a heterocyclic group, m denotes an integer of 0 to 3, and n denotes 0 or 1.

17. The microcapsule according to any one of Aspects 1 to 16, wherein the first film is made of a material containing gelatin and gum Arabic as major components or an organic polymer.

18. A method of manufacturing a microcapsule, the method comprising: a first step of forming a first film having electric charges on the outer surface thereof by adding a polymerization surface-active agent having a polar group having a polarity opposite to that of the electric charges on the outer surface of the first film, a hydrophobic group, and a polymerization group to an aqueous dispersion liquid in which an electrophoretic dispersion liquid containing at least one kind of electrophoretic particles is dispersed and mixing the polymerization surface-active agent with the aqueous dispersion liquid; a second step of adding and emulsifying the polymerization surface-active agent and/or hydrophilic monomers having a polar group having the polarity opposite to that of the electric charges on the outer surface of the first film to the aqueous dispersion liquid; and a third step of forming a second film covering the first film by adding a polymerization initiator to the aqueous dispersion liquid to cause a polymerization reaction.

19. A method of manufacturing a microcapsule, the method comprising: a first step of forming a first film having electric charges on the outer surface thereof by adding a polymerization surface-active agent having a polar group having a polarity opposite to that of the electric charges on the outer surface of the first film, a hydrophobic group, and a polymerization group to an aqueous dispersion liquid in which an electrophoretic dispersion liquid containing at least one kind of electrophoretic particles is dispersed and mixing the polymerization surface-active agent with the aqueous dispersion liquid; a second step of adding and emulsifying a second polymerization surface-active agent having a polar group having a polarity equal to that of the electric charges on the outer surface of the first film and/or a hydrophilic monomer having a polar group having the polarity equal to that of the electric charges on the outer surface of the first film to the aqueous dispersion liquid; and a third step of forming a second film covering the first film by adding a polymerization initiator to the aqueous dispersion liquid to cause a polymerization reaction.

20. The method of manufacturing a microcapsule according to Aspect 18 or 19, wherein a step of adding a comonomer, which can be polymerized with the polymerization surface-active agent, to the aqueous dispersion liquid is provided between the first step and the second step.

21. The method of manufacturing a microcapsule according to Aspect 20, wherein the comonomer contains a hydrophobic monomer.

22. The method of manufacturing a microcapsule according to Aspect 21, wherein the hydrophobic monomer has at least a hydrophobic group and a polymerization group in its molecular structure.

23. The method of manufacturing a microcapsule according to Aspect 22, wherein the hydrophobic group of the hydrophobic monomer includes at least one of an aliphatic hydrocarbon group, an alicyclic hydrocarbon group, and an aromatic hydrocarbon group.

24. The method of manufacturing a microcapsule according to Aspect 22 or 23, wherein the polymerization group of the hydrophobic monomer is a radical-polymerizable unsaturated hydrocarbon group.

25. The method of manufacturing a microcapsule according to Aspect 24, wherein the radical-polymerizable unsaturated hydrocarbon group is one selected from a group consisting of a vinyl group, an aryl group, an acryloyl group, a methacryloyl group, a propenyl group, a vinylidene group, and a vinylene group.

26. The method of manufacturing a microcapsule according to any one of Aspects 20 to 25, wherein the comonomer contains a cross-linking monomer and/or a monomer expressed by General Formula 1:

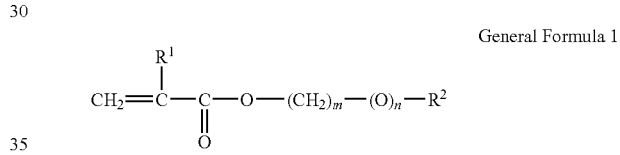

General Formula 1 where $R^1$ denotes a hydrogen atom or a methyl group, $R^2$ denotes a t-butyl group, an alicyclic hydrocarbon group, an aromatic hydrocarbon group, or a heterocyclic group, m denotes an integer of 0 to 3, and n denotes 0 or 1.

27. The method of manufacturing a microcapsule according to any one of Aspects 18 to 26, wherein a step of forming the first film containing the electrophoretic dispersion liquid by the use of a surface deposition method and/or a surface reaction method is provided before the first step.

28. An electrophoretic device comprising: a first substrate; a second substrate opposed to the first substrate; and a plurality of the microcapsules according to any one of Aspects 1 to 17 disposed between the first substrate and the second substrate.

29. An electric apparatus comprising the electrophoretic device according to Aspect 28.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a microcapsule, a method of manufacturing the microcapsule, an electrophoretic device, and an electric apparatus according to exemplary embodiments of the present invention will be described with reference to the accompanying drawings.

First Embodiment

Figure 1:
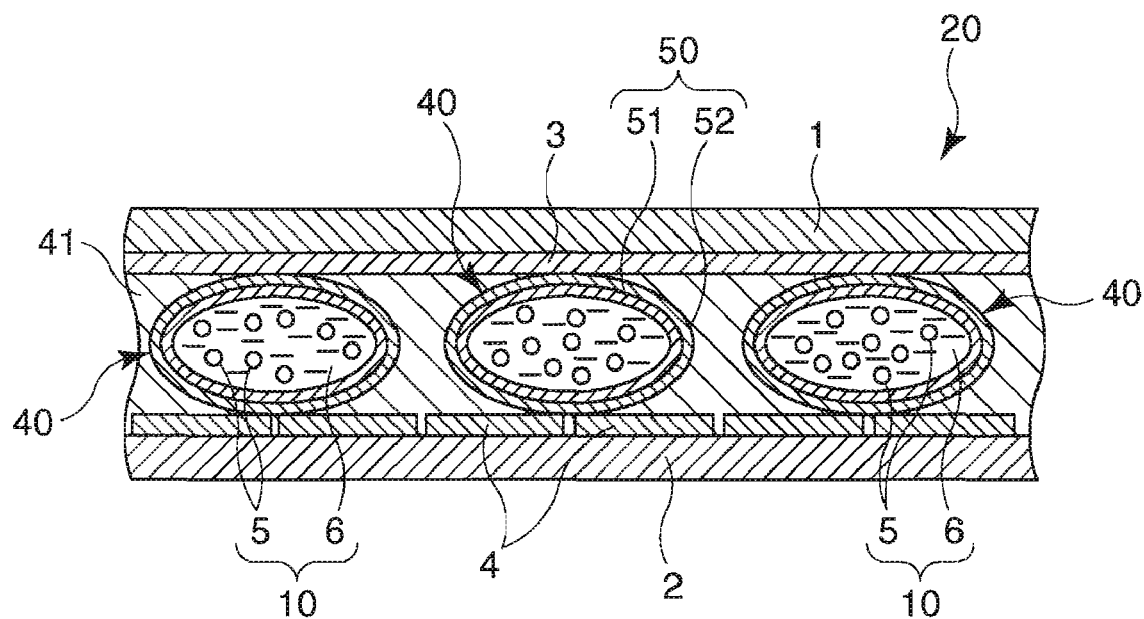
FIG. 1 is a longitudinal-sectional view illustrating an electrophoretic device according to a first embodiment of the present invention.
Figure 2A:
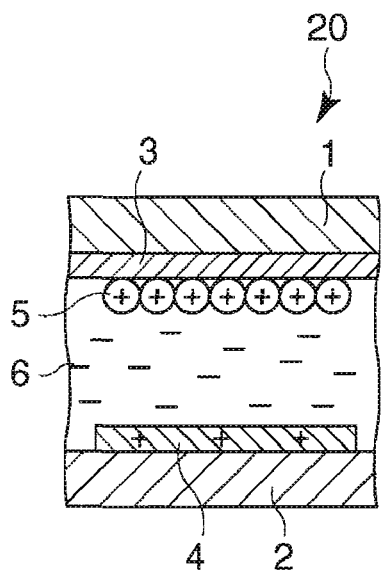
FIGS. 2A and 2B are schematic diagrams illustrating an operation principle of the electrophoretic device shown in FIG. 1.
Figure 2B:
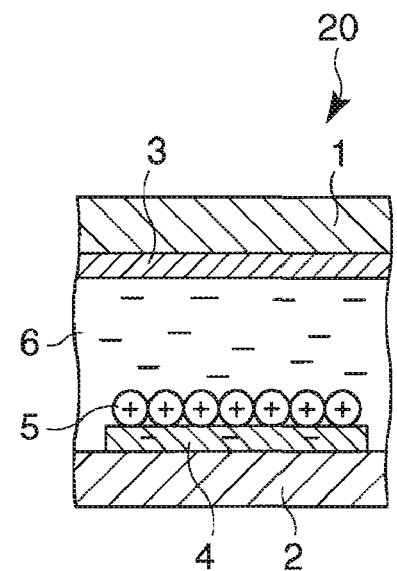

First, an electrophoretic device according to a first embodiment of the invention will be described. FIG. 1 is a longitudinal-sectional view illustrating the electrophoretic device according to the first embodiment of the invention and FIGS. 2A and 2B are schematic diagrams illustrating an operation principle of the electrophoretic device shown in FIG. 1.

In the following description, for the purpose of convenient explanation, the upper side in FIGS. 1 and 2 (which is true in the other figures) is defined as "top" or "upside", and the lower side is defined as "bottom" or "downside." The electrophoretic device 20 shown in FIG. 1 includes a first substrate 1 having a first electrode 3, a second substrate 2 having a second electrode 4 opposed to the first electrode 3, and a plurality of microcapsules 40 provided between the first substrate 1 and the second substrate 2. Hereinafter, configurations of the respective elements are sequentially described.

The first substrate 1 and the second substrate 2 are formed out of sheet-shaped (panel-shaped) members, respectively, and have a function of supporting and protecting the respective elements disposed therebetween.

The substrates 1 and 2 may be flexible or hard, but preferably flexible. By using the substrates 1 and 2 having flexibility, it is possible to obtain an electrophoretic device 20 having flexibility, that is, an electrophoretic device 20 useful for constructing, for example, an electronic paper.

When the substrates 1 and 2 are flexible, examples of the materials thereof can include polyolefin's such as polyethylene, polypropylene, and ethylene-vinyl acetate copolymer, liquid crystal polymers such as denatured polyolefin, polyamide (for example, nylon 6, nylon 46, nylon 66, nylon 610, nylon 612, nylon 11, nylon 12, nylon 6-12, and nylon 6-66), thermoplastic polyimide, and aromatic polyester, thermoplastic elastomer such as polyphenylene oxide, polyphenylene sulfide, polycarbonate, polymethyl methacrylate, polyether, polyetherether ketone, polyether imide, polyacetal, styrene, polyolefin, polyvinyl chloride, polyurethanes, polyesters, polyamides, polybutadiene, transpolyisoprene, fluoro-rubbers, and polyethylene chlorides, and copolymers, blended materials, polymer alloys containing the above-mentioned materials, and the like. One or two or more kinds thereof can be mixed for use.

The (average) thickness of the substrates 1 and 2 are properly set depending upon the materials, applications, and the like, and are not particularly limited. When the substrates 1 and 2 are flexible, the thicknesses thereof are preferably in the range of 20 to 500 μm and more preferably in the range of 25 to 250 μm. Accordingly, it is possible to accomplish a balance between flexibility and strength of the electrophoretic device 20 and to accomplish decrease in size (particularly, decrease in thickness) of the electrophoretic device 20.

The surfaces of the substrates 1 and 2 opposed to the microcapsules 40, that is, the lower surface of the first substrate 1 and the upper surface of the second substrate 2, are provided with the first electrode 3 and the second electrode 4 having a layer shape (film shape), respectively.

When a voltage is applied across the first electrode 3 and the second electrode 4, an electric field is generated therebetween and the electric field acts on electrophoretic particles 5.

In the first embodiment, the first electrode 3 serves as a common electrode and the second electrode 4 serves as individual electrodes (pixel electrodes) partitioned in a matrix shape. A portion where the first electrode 3 and one second electrode 4 overlapping with each other forms a pixel. The first electrode 3 may be divided into plural electrodes, similarly to the second electrodes 4.

The materials of the electrodes 3 and 4 are not particularly limited, if only they have substantially conductivity. Examples thereof can include a variety of conductive materials such as a metal material such as copper, aluminum, nickel, cobalt, platinum, gold, silver, molybdenum, tantalum, and alloys containing them, a carbon material such as carbon black, carbon nanotube, and fullerene, a conductive high-molecular material such as polyacetylene, polypyrrole, polythiophene, polyaniline, poly(p-phenylene), poly(p-phenylene vinylene) polyfluorene, polycarbazole, polysilane, and derivatives thereof, an ionic conductive high-molecular materials in which an ionic material such as $NaCl$, $LiClO_4$, $KCl$, $H_2O$, $LiCl$, $LiBr$, $LiI$, $LiNO_3$, $LiSCN$, $LiCF_3SO_3$, $NaBr$, $NaI$, $NaSCN$, $NaClO_4$, $NaCF_3SO_3$, $KI$, $KSCN$, $KClO_4$, $KCF_3SO_2$, $NH_4I$, $NH_4SCN$, $NH_4ClO_4$, $NH_4CF_3SO_3$, $MgCl_2$, $MgBr_2$, $MgI_2$, $Mg(NO_3)2$, $MgSCN_2$, $Mg(CF_3SO_3)_2$, $CaBr_2$, $CaI_2$, $CaSCN_2$, $Ca(ClO_4)_2$, $Ca(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, and $Cu(CF_3SO_3)_2$ is dispersed in matrix resin such as polyvinyl alcohol, polycarbonate, polyethylene oxide, polyvinyl butyral, polyvinyl carbazole, and vinyl acetate, a conductive oxide material such as indium tin oxide (ITO), fluorine-doped tin oxide (FTO), tin oxide ($SnO_2$), and indium oxide (IO). One or two or more kinds thereof can be combined for use.

In addition, as the materials of the electrodes 3 and 4, a variety of complex materials having conductivity by mixing a conductive material (conductive particles) such as gold, silver, nickel, and carbon with a non-conductive material such as a glass material, a rubber material, and a high-molecular material can be used.

Examples of the complex materials can include a conductive rubber in which a conductive material is mixed with a rubber material, a conductive adhesive or conductive paste in which a conductive material is mixed with an adhesive composition such as epoxy, urethanes, and acrylate, and a conductive resin in which a conductive material is mixed with a matrix resin such as polyolefin, polyvinylchloride, polystyrene, ABS resin, nylon (polyamide) ethylene-vinyl acetate copolymer, polyester, acryl resin, epoxy resin, and urethane resin.

The (average) thicknesses of the electrodes 3 and 4 are properly set depending upon the materials applications, and the like, and are not particularly limited, but are preferably in the range of 0.05 to 10 μm and more preferably in the range of 0.05 to 5 μm.

The substrate and electrode (in the first substrate 1 and the first electrode 3 in the first embodiment) disposed on a display plane among the substrates 1 and 2 and the electrodes 3 and 4 have preferably a light transmitting property, that is, preferably substantially transparency (colorless transparency, colored transparency, or semi-transparency). Accordingly, the state of the electrophoretic particles 5 in an electrophoretic dispersion liquid 10 to be described later, that is, the information (images) displayed on the electrophoretic device 20 can be easily recognized with naked eyes.

The electrodes 3 and 4 may have a multi-layered structure in which a plurality of materials is sequentially stacked, in addition to a single-layered structure including a simplex of the above-mentioned materials. That is, the electrodes 3 and 4 may have a single-layered structure of an ITO layer or a two-layered structure of an ITO layer and a polyaniline layer.

A plurality of microcapsules 40 is disposed between the first electrode 3 and the second electrode 4 and is fixed by a binder material 41.

The binder material 41 serves to fix the microcapsules 40 and also to secure insulation between the electrodes 3 and 4. Accordingly, it is possible to further enhance the durability and reliability of the electrophoretic device 20.

A resin material having an excellent affinity for (adhesion to) the electrodes 3 and 4 and the microcapsules 40 (capsule body 50) and an excellent insulating property can be suitably used as the binder material 41.

The resin material is not particularly limited and examples thereof can include thermoplastic resin such as polyethylene, polyethylene chloride, ethylene-vinyl acetate copolymer, ethylene-acrylic ethyl copolymer, polypropylene, ABS resin, methyl methacrylate resin, vinyl chloride resin, vinyl chloride-vinyl acetate copolymer, vinyl chloride-vinylidene chloride copolymer, vinyl chloride-ester acetate copolymer, vinyl chloride-methacrylate copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol, polyvinyl formal, and cellulose resin, high molecules such as polyamide resin, polyacetal, polycarbonate, polyethylene terephthalate, polybutylene terephthalate, polyphenylene oxide, polysulfon, polyamide imide, polyamino bismaleimide, polyether sulfon, polyphenylene sulfon, polyacrylate, grafted polyphenylene ether, polyether ether ketone, and polyether imide, fluorine resin such as poly tetrafluoride ethylene, polyethylene propylene fluoride, tetrafluoride ethylene-perfluoroalkoxy ethylene copolymer, ethylene-tetrafluoride ethylene copolymer, polyfluoride vinylidene, poly trifluorochloride ethylene, and fluorine rubber, silicon resin such as silicon resin and silicon rubber, methacrylate-styrene copolymer, polybutylene, and methyl methacrylate-butadiene-styrene copolymer. One or two or more kinds thereof can be combined for use.

The dielectric constant of the binder material 41 is preferably set substantially equal to the dielectric constant of a dispersion medium 6 used for preparing the electrophoretic dispersion liquid 10 to be described later. Accordingly, a dielectric constant regulator such as alcohols of 1,2-butanol and 1,4-butanol, ketone, and carbonic salt is added preferably to the binder material 41.

The microcapsules 40 according to the invention include an electrophoretic dispersion liquid 10 and a capsule body capsule shell) 50 enclosing the electrophoretic dispersion liquid 10.

The electrophoretic dispersion liquid 10 is obtained by dispersing (suspending) at least one kind of electrophoretic particles 5 in a dispersion medium 6.

The material of the electrophoretic particles 5 is not particularly limited and various materials can be used. A material containing at least one of pigment, resin, ceramics, metal, metal oxide, and mixtures containing them can be used suitably. The electrophoretic particles 5 containing the materials as a major component can be easily prepared.

Complex particles containing two or more kinds of the materials can be used for the electrophoretic particles 5.

Examples of the pigment can include black pigment such as aniline black, carbon black, and titanium black, white pigment such as titanium dioxide, antimony trioxide, barium sulfate, zinc sulfate, zinc oxide, and silicon dioxide, azo pigment such as monoazo, disazo, and polyazo, yellow pigment such as isoindoline, chrome yellow, yellow iron oxide, cadmium yellow, titanium yellow, and antimony, red pigment such as quinacridone red and chrome vermilion, blue pigment such as phthalocyanine blue, induslene blue, Prussian blue, navy blue, and cobalt blue, and green pigment such as phthalocyanine green. One or two or more kinds thereof can be combined for use.

Examples of the resin can include acryl resin, urethane resin, urea resin, epoxy resin, polystyrene, and polyester. One or two or more kinds thereof can be combined for use.

Examples of the complex particles can include particles obtained by coating pigment particles with resin and particles obtained by coated resin particles with pigment.

The average diameter of the electrophoretic particles 5 is preferably in the range of 0.1 to 10 μm and more preferably in the range of 0.1 to 7.5 μm. When the average diameter of particles is too small, aggregation between the electrophoretic particles 5 can easily occur and when the average diameter of particles is too large, the electrical migration may be difficult depending upon the kinds.

The dispersion of the electrophoretic particles 5 in the dispersion medium 6 can be performed by a paint shaker method, a ball mill method, a media mill method, an ultrasonic dispersion method, and a stirring dispersion method or by combination two or more kinds thereof.

An organic solvent having a relatively high insulating property and a polarity lower than that of an aqueous dispersion liquid used for manufacturing the microcapsules 40 to be described later can be suitably used as the dispersion medium 6.

The dispersion medium 6 can include at least one selected from a group consisting of: aromatic hydrocarbons of benzene hydrocarbon such as benzene, toluene, o-xylene, m-xylene, p-xylene, mixed xylene, ethylbenzene, hexylbenzne, dodecyl benzene, and phenyl xylyl ethane, and the like; aliphatic hydrocarbons of paraffin hydrocarbon such as n-hexane and 1-decane, isoparaffin hydrocarbon such as Isopar (made by Exxon Chemical Company), olefin hydrocarbon such as 1-octene and 1-decene, and naphthene hydrocarbon such as cyclohexane and decarine, and the like; petroleum or hydrocarbon mixtures derived from petroleum such as kerosene, petroleum ether, petroleum benzene, ligroin, industrial gasoline, coal tar naphtha, petroleum naphtha, and solvent naphtha; hydrocarbon halides such as dichloromethane, chloroform, carbon tetrachloride, 1,2-dichloroethane, 1,1,1-trichloroethane, 1,1,2,2-tetrachloroethane, trichlorofluoroethane, tetrabromoethane, dibromotetrafluoroethane, tetrafluorodiiodo ethane, 1,2-dichloroethylene, trichloroethylene, tetrachloroethylene, trichlorofluoroethylene, chlorobutane, chlorocyclohexane, chlorobenzene, o-dichlorobenzene, bromobenzene, iodomethane, diiodomethane, and iodoform; silicon oils (organic silicon oils) such as dimethyl silicon oil and methylphenyl silicon oil; fluorine solvents (organic fluorine solvents) such as hydrofluoroether.

By using such a dispersion medium 6, it is possible to further smooth the electrophoresis of the electrophoretic particles 5 and to more surely make the electrophoretic dispersion liquid 10 be liquid droplets in an aqueous medium in the process of manufacturing a first film of the microcapsule 40 to be described later, thereby satisfactorily manufacturing the microcapsules 40.

Among the organic solvents described above, long-chain alkyl benzene such as hexyl benzene and dodecyl benzene, phenyl silyl ethane, and the like can be preferably used because they have high boiling point and flash point and no toxicity.

In addition to those described above, examples of the dispersion medium 6 can include cellosolve such as methyl cellosolve, ethyl cellosove, and phenyl cellosolve, esters such as methyl acetate, ethyl acetate, butyl acetate, and ethyl formate, ketone such as acetone, methyl ethyl ketone, diethyl ketone, methyl isobutyl ketone, methyl isopropyl ketone, and cyclohexanone, alicyclic hydrocarbon such as cyclohexane and methyl cyclohexane, aromatic heterocycle such as pyridine, pyridine, furan, pyrrole, thiophene, and methyl pyrolidone, nitrile such as acenitrile, propionitrile, and acrylonitrile, amides such as N,N-dimethyl formamide and N,N-dimethyl acetamide, and carbonic salts.

A charge regulator including particles of electrolyte, surface-active agent, metallic soap resin material, rubber material, oil, varnish, and compound, a dispersion agent such as titanium coupling agent, aluminum coupling agent, and silane coupling agent, and a variety of additives such as lubricant and stabilizer may be added to the dispersion medium 6 (electrophoretic dispersion liquid 10) as needed.

A variety of pigments such as anthraquinone pigments, azo pigments, indigoid pigments, triphenyl methane pigments, pyrazolone pigments, stilbene pigments, diphenyl methane pigments, xanthene pigments, alizarin pigments, acridine pigments, quinone imine pigments, thiazole pigments, methine pigments, nitro pigments, and nitroso pigments may be dissolved in the dispersion medium 6 as needed.

The sizes of the microcapsules 40 are preferably substantially uniform. Accordingly, the electrophoretic device 20 can exhibit excellent display performance. The microcapsules 40 having a uniform size can be obtained by the use of a filtering method, a specific-gravity-difference classification method, or the like.

The size (average diameter) of the microcapsules 40 is not particularly limited, but preferably in the range of 10 to 150 μm and more preferably in the range of 20 to 100 μm.

The microcapsules 40 enclose the electrophoretic dispersion liquid 10 therein.

The method of manufacturing the microcapsules 40 will be described in detail later.

In the electrophoretic device 20 having the microcapsules 40, when a voltage is applied across the first electrode 3 and the second electrode 4, the electrophoretic particles 5 electrically migrate toward an electrode depending upon the electric field generated therebetween.

For example, when the electrophoretic particles 5 are charged to plus electricity and the second electrode 4 is set to a positive potential, as shown in FIG. 2A, the electrophoretic particles 5 move to the first electrode 3 and gather in the first electrode 3. Accordingly, when the electrophoretic device 20 is viewed from the upside (from the display plane side), the color of the electrophoretic particles 5 is visible.

On the contrary, when the second electrode 4 is set to a negative potential, as shown in FIG. 2B, the electrophoretic particles 5 moves toward the second electrode 4 and gathers in the second electrode 4. Accordingly, when the electrophoretic device 20 is viewed from the upside (from the display plane side), the color of the dispersion medium 6 is visible.

Therefore, by properly setting the physical properties (such as colors, positive and negative polarities, and an amount of charges) of the electrophoretic particles 5, the polarities of the electrodes 3 and 4, and the potential difference between the electrodes 3 and 4, desired information (image) can be displayed on the display plane of the electrophoretic device 20 by means of combination of the color or the electrophoretic particles 5 and the color of the dispersion medium 6.

It is preferable that the specific gravity of the electrophoretic particles 5 is set substantially equal to the specific gravity of the dispersion medium 6. Accordingly, even after the application of a voltage across the electrodes 3 and 4, the electrophoretic particles 5 can stay at constant positions in the dispersion medium 6 for a long time. That is, the information displayed on the electrophoretic device 20 is retained for a long time.

In the invention, the capsule body 50 includes a first film 51 containing the electrophoretic dispersion liquid 10 and a second film 52 formed out of an organic polymer 60 having a hydrophobic property higher than that of the material of the first film 51. In the capsule body 50, since the hydrophobic property of the organic polymer 60 is enhanced and thus the moisture resistance of the microcapsule 40 according to the invention is improved, it is possible to prevent the amount of moisture in the electrophoretic dispersion liquid 10 from increasing. As a result, in the electrophoretic device 20, it is possible to surely prevent decrease in characteristics (operation speed).

Since the organic polymer 60 is a relatively dense film obtained through a polymerization reaction, pigments dissolved and colored in the dispersion medium 6 can be prevented from contacting oxygen, thereby satisfactorily preventing deterioration and fading of color of the electrophoretic dispersion 10 due to oxidation. In addition, since the organic polymer 60 is a relatively dense film, it is possible to enhance the mechanical strength of the capsule body 50 and the microcapsules 40 by reinforcing the first film 51. Accordingly, even when a force for deforming the microcapsules 40 is applied to the microcapsules 40, the microcapsules 40 have high flexibility of retaining the electrophoretic dispersion liquid 10 without leakage.

Since the organic polymer 60 has a high UV absorbing rate so as to suppress the irradiation of UV to the pigments or the like, it is possible to satisfactorily suppress the deterioration and the fading of color of the electrophoretic dispersion liquid 10 due to UV.

Consequently, the microcapsules 40 having the capsule body 50 have excellent weather resistance to environmental factors such as moisture, oxygen, and UV. As a result, the display performances (such as coloring property and contrast) of the electrophoretic device 20 can be held in better states for a long time.

The microcapsules 40 according to the invention can have the following advantages:
1. Improvement in mechanical strength and flexibility;
2. Sure prevention of the electrophoretic dispersion liquid from leakage;
3. Prevent of the electrophoretic dispersion liquid from deterioration due to absorption of moisture; and
4. Suppression of the electrophoretic dispersion liquid from deterioration due to oxygen and UV.

Examples of the microcapsule 40 can include the following microcapsules I to IV:

I. A microcapsule having a capsule body 50 in which the first film 51 having minus electric charges 64 on the outer surface thereof and containing the electrophoretic dispersion liquid 10 is coated with the second film 52 formed out of the organic polymer 60 having a polar group opposite to that of the electric charges 64 on the inner surface and the outer surface thereof, that is, a cationic group;

II. A microcapsule having a capsule body 50 in which a first film 51 having minus electric charges 64 on the outer surface thereof and containing the electrophoretic dispersion liquid 10 is coated with the second film 52 formed out of the organic polymer 60 having a polar group opposite to that of the electric charges 64, that is, a cationic group, on the inner surface thereof and a polar group having a polarity equal to the electric charges 64, that is, an anionic group, on the outer surface thereof;

III. A microcapsule having a capsule body 50 in which the first film 51 having plus electric charges 64 on the outer surface thereof and containing the electrophoretic dispersion liquid 10 is coated with the second film 52 formed out of the organic polymer 60 having a polar group opposite to that of the electric charges 64 on the inner surface and the outer surface thereof, that is, an anionic group; and IV. A microcapsule having a capsule body 50 in which a first film 51 having plus electric charges 64 on the outer surface thereof and containing the electrophoretic dispersion liquid 10 is coated with the second film 52 formed out of the organic polymer 60 having a polar group opposite to that of the electric charges 64, that is, an anionic group, on the inner surface thereof and a polar group having a polarity equal to the electric charges 64, that is, a cationic group, on the outer surface thereof.

The first film 51 having minus electric charges 64 on the outer surface thereof and containing the electrophoretic dispersion liquid 10 is hereinafter referred to as a "dispersion liquid encloser."

Hereinafter, the micro capsules 40 of Case I to IV will be described with reference to dispersion states of the dispersion liquid encloser which can appear in the process of manufacturing the microcapsules. However, the following dispersion states include estimations.

The first film 51 of all the microcapsules of Cases I to IV can be made of a conventional material.

Specifically, examples of the material of the first film 51 can include a variety of resin materials such as a complex material of gum Arabic and gelatin, urethane resin, melamine resin, urea resin, epoxy resin, polyamide, and polyether. One or two or more kinds selected therefrom can be combined for use. The materials have electric charges on the surfaces thereof, thereby strongly bonding the second film 52 to the first film by means of electrostatic attractive force occurring between the electric charges of the first film 51 and the polar group of the second film 52.

The method of manufacturing the dispersion liquid encloser having the first film 51 (the method of enclosing the electrophoretic dispersion liquid 10 in the first film 51) is not particularly limited, and examples thereof can include a variety of micro-encapsulation methods such as surface deposition methods such as a coacervation method (phase separation method), a liquid drying method, a melting-decomposition cooling method, a spray drying method, pan coating method, an aerial suspension liquid coating method, and a powder bed method, surface reaction methods such as a surface polymerization method, an in-situ polymerization method, a liquid-curing coating method (orifice method), and an inorganic chemical reaction method, and the like. The micro-encapsulation methods may be properly selected depending upon the materials of the first film 51, but preferably one or two or more selected from the coacervation method, the in-situ polymerization method, the surface polymerization method, the liquid drying method, and the melting-decomposition cooling method can be combined for use.

According to the methods, the electrophoretic dispersion liquid 10 can be suitably used as a core material contained in the shell (the first film 51).

In the coacervation method among the micro-encapsulation methods, a material obtained by combining a compound such as gelatin having an isoelectric point, a cationic compound such as polyethyleneimine, and an anionic compound such as gum Arabic, sodium alginic acid, styrene-maleic anhydride copolymer, vinylmethyl ether-maleic anhydride copolymer, phthalate ester of starch, and polyacrylic acid can be suitably used.

In the in-situ polymerization method, a material such as melamine-formalin resin (melamine-formalin prepolymer) and radical polymerized monomer can be suitably used.

In the surface polymerization method, a material obtained by combining hydrophilic monomer such as polyamine, glycol, and polyvalent phenol, hydrophobic monomer such as polyvalent halide chloride and polyvalent isocyanato can be suitably used. Accordingly, it is possible to obtain the dispersion liquid encloser having the first film 51 made of polyamide, epoxy resin, polyurethane, or poly urea.

A cross-linking agent can be used in the micro-encapsulation methods. Accordingly, it is possible to obtain the dispersion liquid encloser having excellent durability.

Examples of the cross-linking agent can include aldehyde compound such as formalin and glyoxal, urea compound such as urea and thiourea, melamine compound such as melamine and methylol melamine, and polyvalent amine compound such as polyfunctional epoxy compound, polyfunctional oxazoline compound, aqueous dispersible isocyanato compound, ethylene diamine, and polyethyleneimine. One or two or more kinds can be combined for use.

When the material of the first film does not have substantially a polarity (when it does not have any polarity or has a very small amount of electric charges), the first film 51 (dispersion liquid encloser) used for the invention can be obtained by performing such a process of giving electric charges to the outer surface of the first film (dispersion liquid encloser).

An example of the process of giving electric charges to the first film can include a method of adsorbing a compound such as a coupling agent and a surface-active agent having a polarity.

Next, the second film 52 of Cases I to IV will be sequentially described.

Case I

Figure 3A:
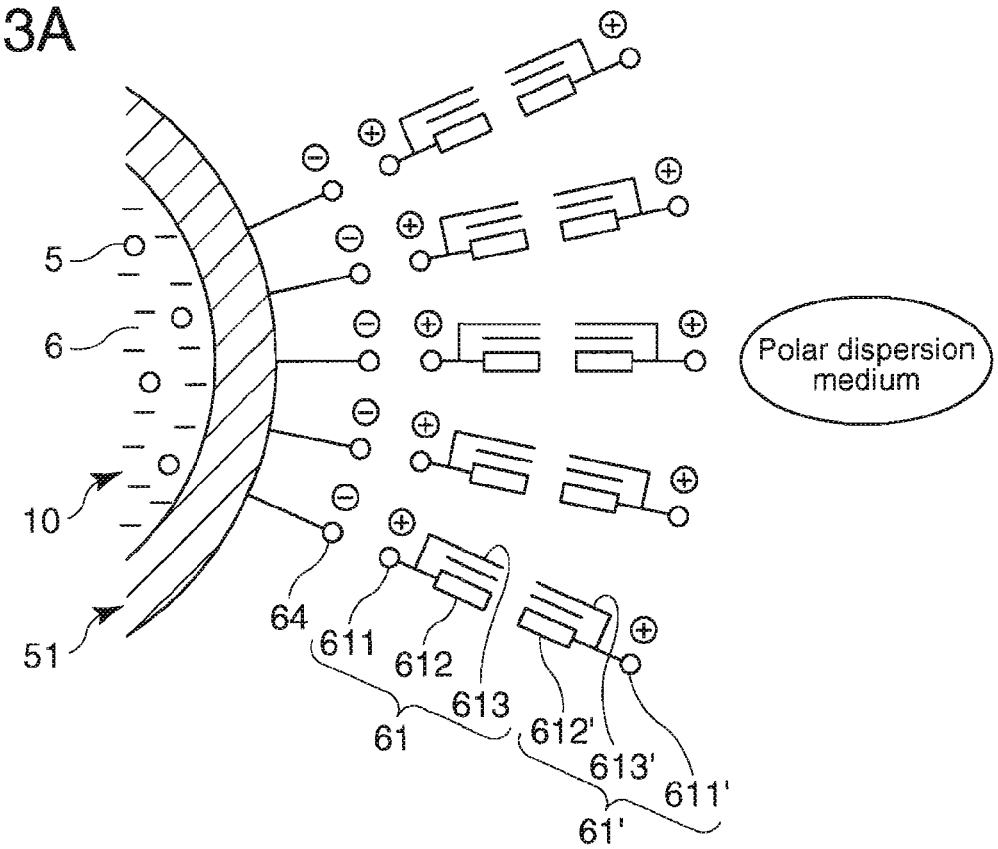
FIGS. 3A and 3B are a diagram illustrating a dispersion state or a dispersion liquid encloser which can appear in the process of manufacturing a microcapsule in Case I and a schematic diagram illustrating the microcapsule having organic polymers obtained by polymerizing monomers, respectively.

FIG. 3A is a diagram illustrating a dispersion state of the dispersion liquid encloser which can appear in the process of manufacturing the microcapsule 40 of Case I.

In Case I, the first film 51 has the minus electric charges 64 on the outer surface thereof and the first film 51 is covered with a polymerization surface-active agent 61 having a polar group opposite to that of the electric charges 64, that is, a cationic group 611, a hydrophobic group 612, and a polymerization group 613.

In this state, the first film 51 having the minus electric charges 64 is dispersed in the polar dispersion medium and coexists with the polymerization surface-active agent 61 having the cationic group 611, the hydrophobic group 612, and the polymerization group 613.

In the polymerization surface-active agent 61, the cationic group 611 is aligned toward the outer surface of the first film 51 having the minus electric charges 64 and then is adsorbed thereto with a strong ion bond. The hydrophobic group 612 and the polymerization group 613 of the polymerization surface-active agent 61 are opposed to a hydrophobic group 612' and a polymerization group 613' of another polymerization surface-active agent 61' by means of a hydrophobic interaction and a cationic group 611' is directed in a direction in which the polar dispersion medium exists, that is, in a direction in which the distance from the first film 51 is increased.

Figure 3B:
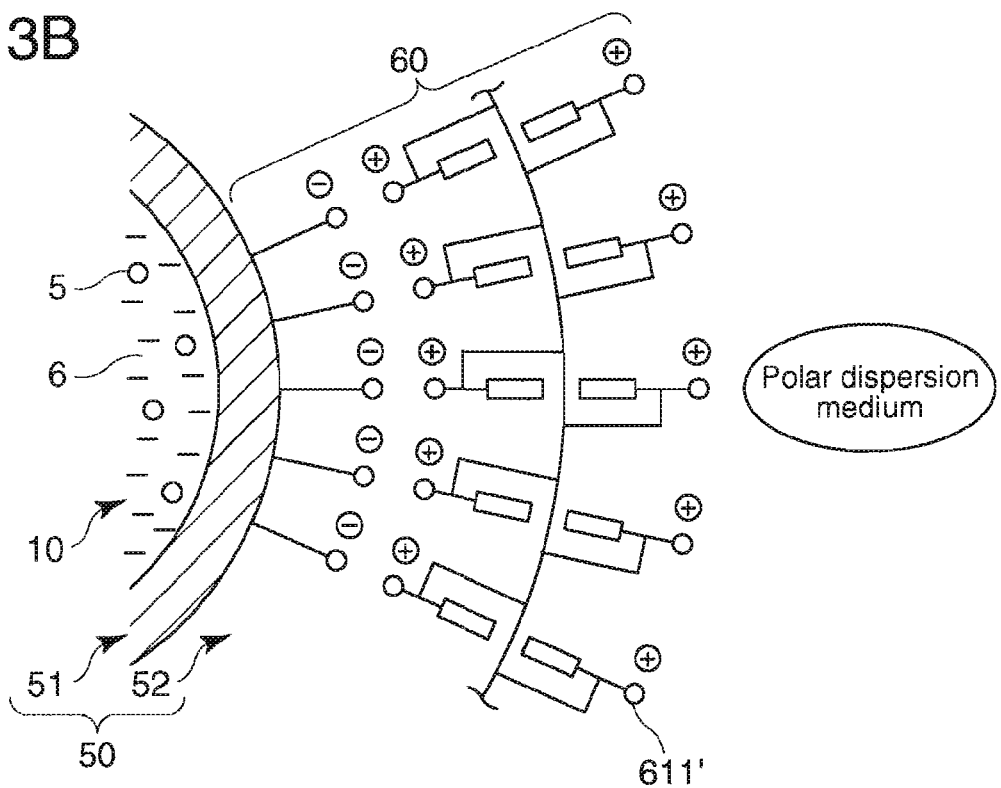

By adding, for example, a polymerization initiator to the polar dispersion medium in such a dispersion state to polymerize the polymerization groups 613 and 613' of the polymerization surface-active agents 61 and 61' with each other, as shown in FIG. 3B, the second film 52 is formed in which the first film 51 is coated with the organic polymer 60 having a repeated structure unit derived from the polymerization surface-active agents 61 and 61'.

As described above, since the second film 52 coats the first film 51, a two-layered capsule body 50 is obtained.

Figure 4A:
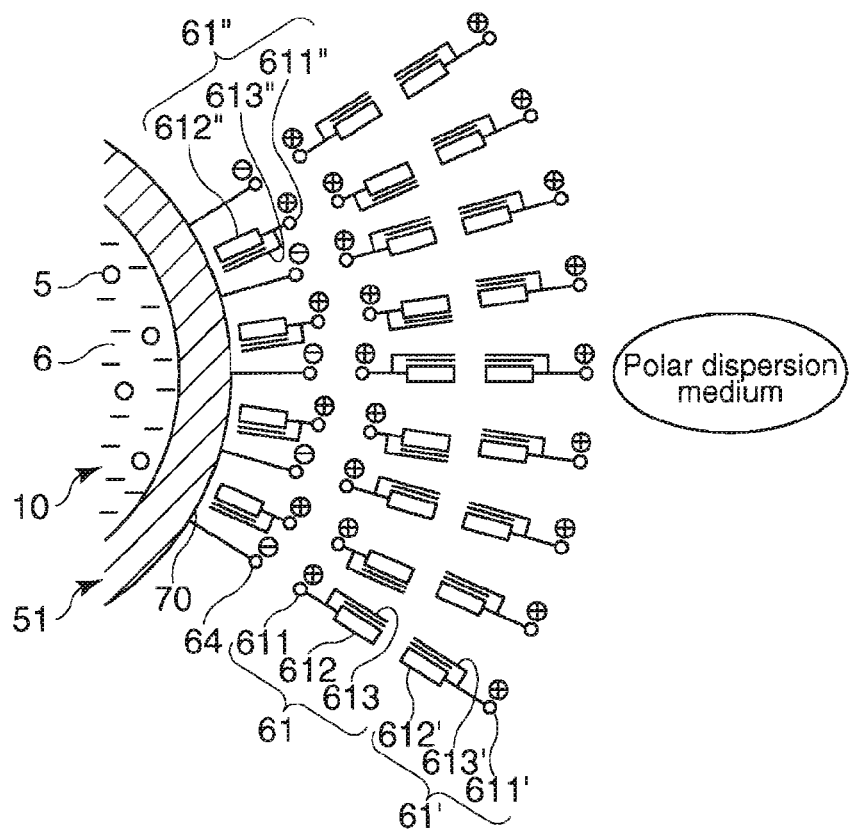
FIGS. 4A and 4B are a diagram illustrating another dispersion state of the dispersion liquid encloser which can appear in the process of manufacturing the microcapsule in Case I and a schematic diagram illustrating the microcapsule having organic polymers obtained by polymerizing monomers, respectively.

FIG. 4A is a diagram illustrating another dispersion state of the dispersion liquid encloser which can appear in the process of manufacturing the microcapsule 40 of Case I.

In the polymerization surface-active agent 61, the cationic group 611 is aligned toward the outer surface of the first film 51 having the minus electric charges 64 and then is adsorbed thereto with a strong ion bond. The hydrophobic group 612 and the polymerization group 613 of the polymerization surface-active agent 61 are opposed to a hydrophobic group 612' and a polymerization group 613' of another polymerization surface-active agent 61' by means of a hydrophobic interaction and a cationic group 611' is directed in a direction in which the polar dispersion medium exists, that is, in a direction in which the distance from the first film 51 is increased.

The outer surface of the first film 51 has the minus electric charges 64 chemically coupled with a specific density and has a hydrophobic region 70 between the minus electric charges 64. A hydrophobic group 612" and a polymerization group 613" of another polymerization surface-active agent 61" are directed to the hydrophobic region 70. The polymerization surface-active agent 61' is disposed so that the cationic group 611' is opposed to a cationic group 611" of the polymerization surface-active agent 61". The hydrophobic groups 612 and 612" and the polymerization groups 613 and 613" of the polymerization surface-active agents 61 and 61" are opposed to the hydrophobic group 612' and the polymerization group 613' of the polymerization surface-active agent 61', respectively, by means of hydrophobic interactions and the cationic group 611' is directed in a direction in which the polar dispersion medium exists, that is, in a direction in which the distance from the first film 51 is increased.

Figure 4B:
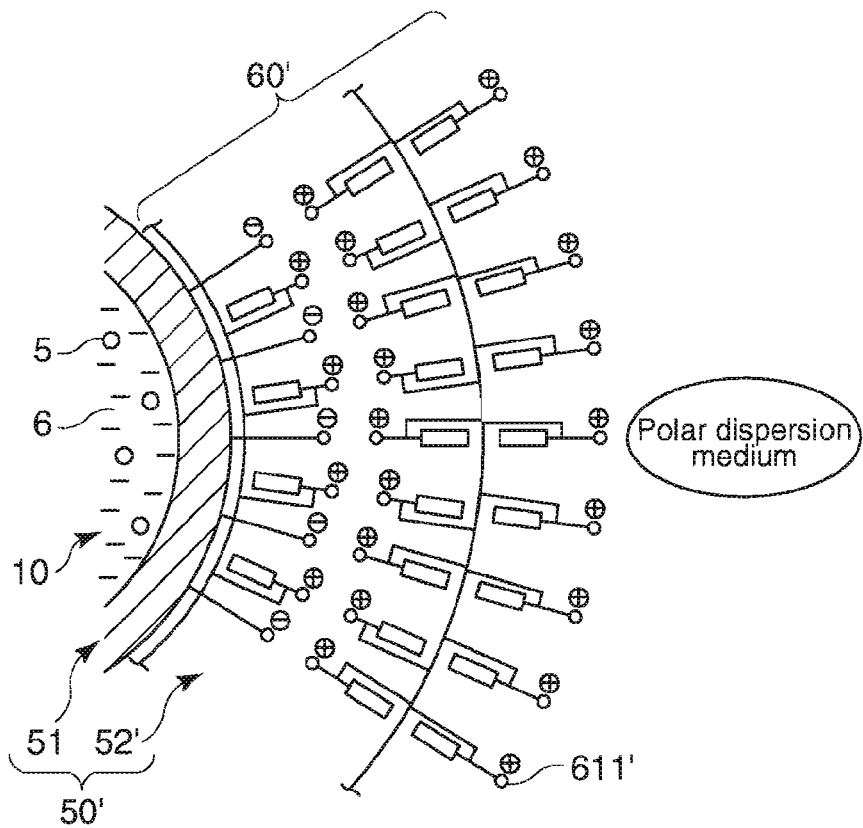

By adding, for example, a polymerization initiator to the polar dispersion medium in such a dispersion state to polymerize the polymerization groups 613, 613', and 613" of the polymerization surface-active agents 61, 61', and 61" with each other, as shown in FIG. 4B, a capsule body 50' having a two-layered structure that the first film 51 is coated with the second film 52' formed out of the organic polymer 60'.

Case II

Figure 5A:
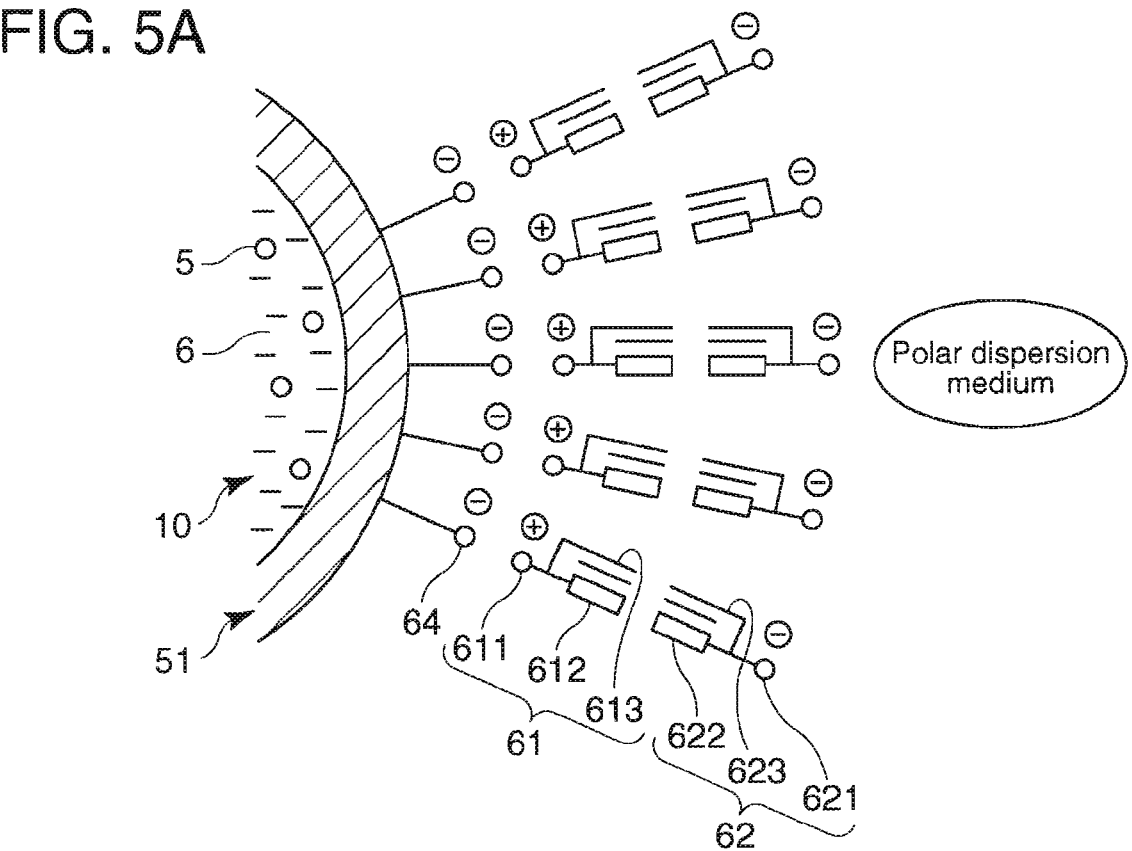
FIGS. 5A and 5B are a diagram illustrating a dispersion state of a dispersion liquid encloser which can appear in the process of manufacturing a microcapsule in Case II and a schematic diagram illustrating the microcapsule having organic polymers obtained by polymerizing monomers, respectively.

FIG. 5A is a diagram illustrating a dispersion state of the dispersion liquid encloser which can appear in the process of manufacturing the microcapsule 40 of Case II.

In Case II, the first film 51 has the minus electric charges 64 on the outer surface thereof and the first film 51 is covered with a polymerization surface-active agent 61 having a polar group opposite to that of the electric charges 64, that is, a cationic group 611, a hydrophobic group 612, and a polymerization group 613 and a second polymerization surface-active agent 62 having a polar group equal to that of the electric charges 64, that is, an anionic group 621, a hydrophobic group 622, and a polymerization group 623.

In this state, the first film 51 having the minus electric charges 64 is dispersed in the polar dispersion medium and coexists with the polymerization surface-active agent 61 having the cationic group 611, the hydrophobic group 612, and the polymerization group 613 and the second polymerization surface-active agent 62 having the anionic group 621, the hydrophobic group 622, and the polymerization group 623.

In the polymerization surface-active agent 61, the cationic group 611 is aligned toward the outer surface of the first film 51 having the minus electric charges 64 and then is adsorbed thereto with a strong ion bond. The hydrophobic group 612 and the polymerization group 613 of the polymerization surface-active agent 61 are opposed to the hydrophobic group 622 and the polymerization group 623 of the second polymerization surface-active agent 62 by means of a hydrophobic interaction and the anionic group 621 is directed in a direction in which the polar dispersion medium exists, that is, in a direction in which the distance from the first film 51 is increased.

Figure 5B:
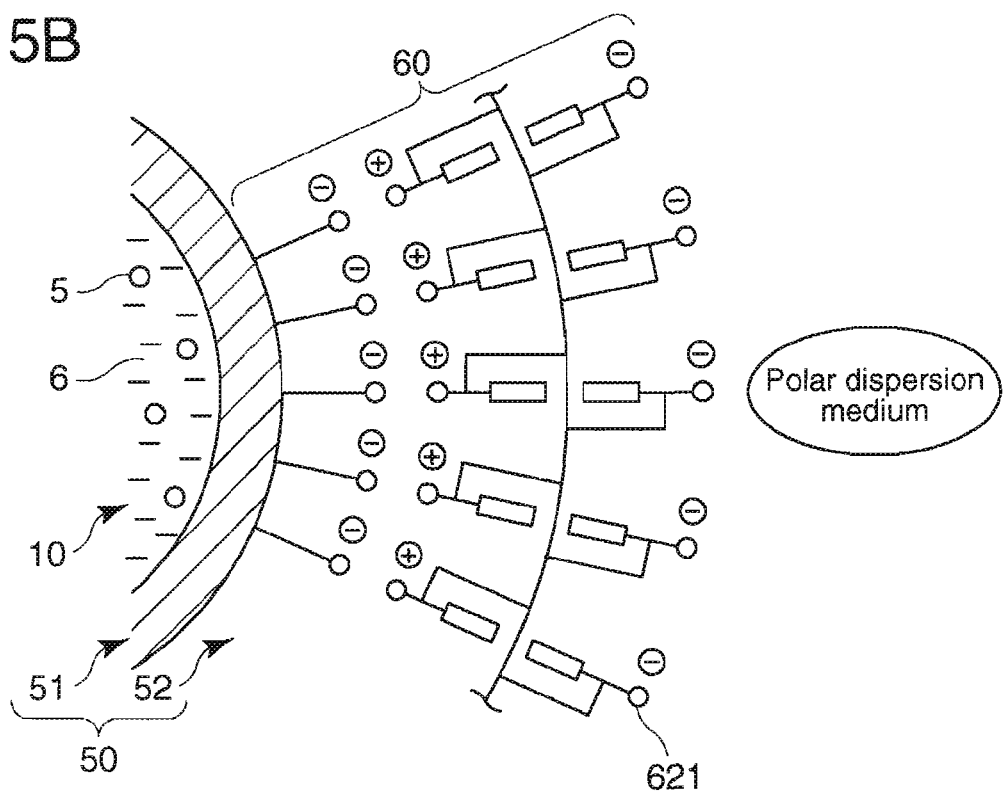

By adding, for example, a polymerization initiator to the polar dispersion medium in such a dispersion state to polymerize the polymerization groups 613 and 623 of the polymerization surface-active agents 61 and 62 with each other, as shown in FIG. 5B, the second film 52 is formed in which the first film 51 is coated with the organic polymer 60 having a repeated structure unit derived from the polymerization surface-active agents 61 and 61 and a repeated structure unit derived from the second polymerization surface-active agent 62.

As described above, since the second film 52 coats the first film 51, a two-layered capsule body 50 is obtained.

Figure 6A:
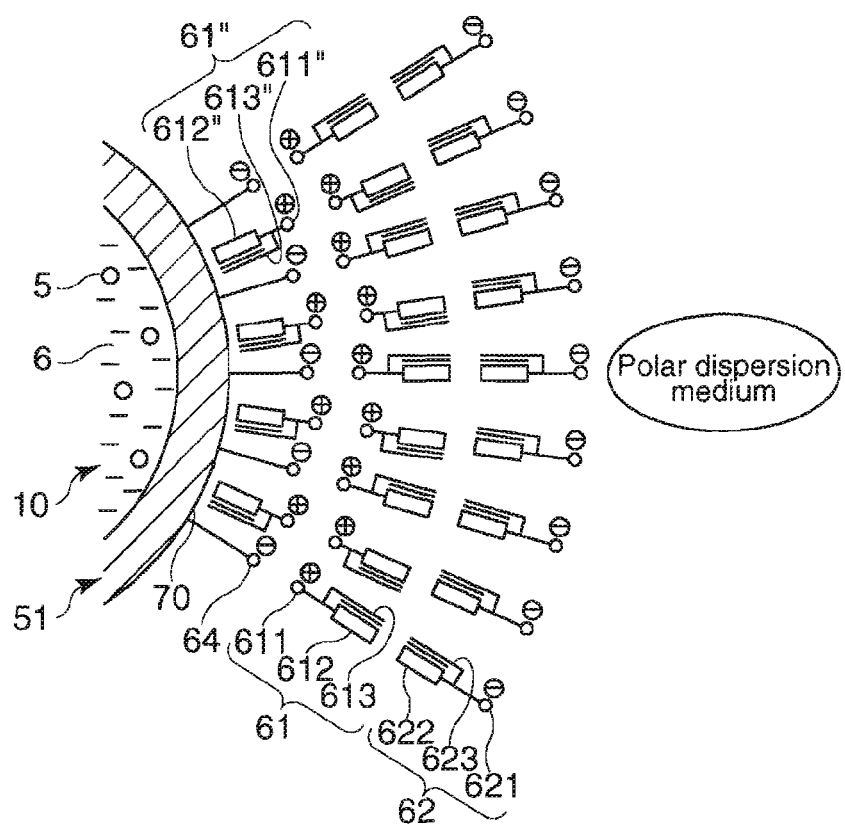
FIGS. 6A and 6B are a diagram illustrating another dispersion state of the dispersion liquid encloser which can appear in the process of manufacturing the microcapsule in Case II and a schematic diagram illustrating the microcapsule having organic polymers obtained by polymerizing monomers, respectively.

FIG. 6A is a diagram illustrating another dispersion state of the dispersion liquid encloser which can appear in the process of manufacturing the microcapsule 40 of Case II.

In the polymerization surface-active agent 61, the cationic group 611 is aligned toward the outer surface of the first film 51 having the minus electric charges 64 and then is adsorbed thereto with a strong ion bond. The hydrophobic group 612 and the polymerization group 613 of the polymerization surface-active agent 61 are opposed to the hydrophobic group 622 and the polymerization group 623 of the second polymerization surface-active agent 62 by means of a hydrophobic interaction and the anionic group 621 is directed in a direction in which the polar dispersion median exists, that is, in a direction in which the distance from the first film 51 is increased.

The outer surface of the first film 51 has the minus electric charges 64 chemically coupled with a specific density and has a hydrophobic region 70 between the minus electric charges 64. A hydrophobic group 612" and a polymerization group 613" of another polymerization surface-active agent 61" are directed to the hydrophobic region 70. The second polymerization surface-active agent 62 is disposed so that the anionic group 621 is opposed to a cationic group 611" of the polymerization surface-active agent 61". The hydrophobic groups 612 and 612" and the polymerization groups 613 and 613" of the polymerization surface-active agents 61 and 61" are opposed to the hydrophobic group 622 and the polymerization group 623 of the second polymerization surface-active agent 62, respectively, by means of hydrophobic interactions and the anionic group 621 is directed in a direction in which the polar dispersion medium exists, that is, in a direction in which the distance from the first film 51 is increased.

Figure 6B:
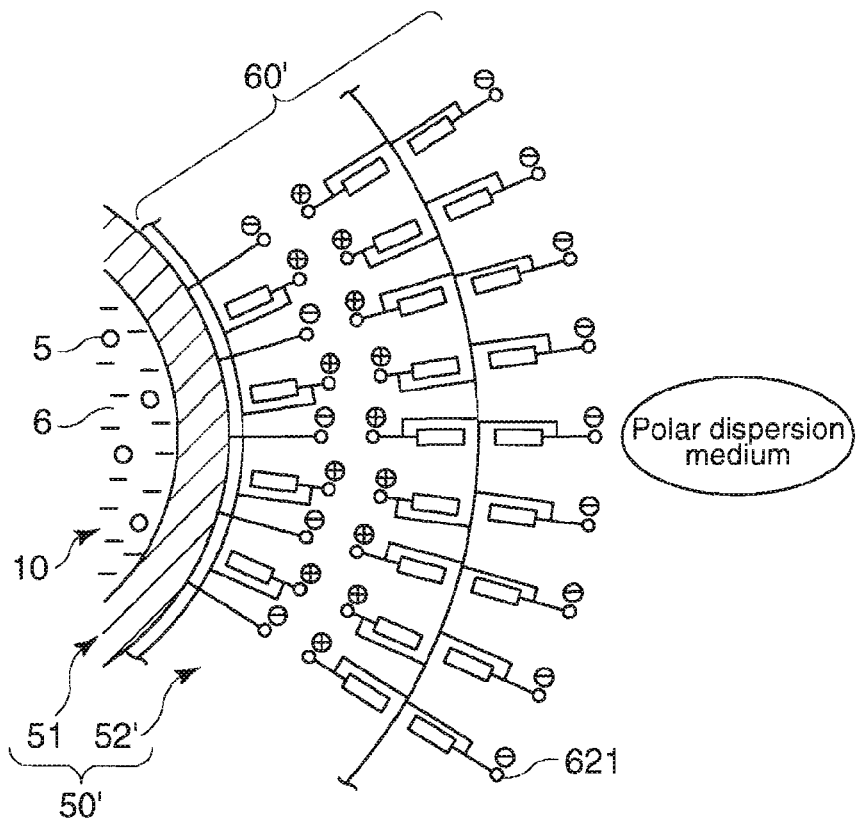

By adding, for example, a polymerization initiator to the polar dispersion medium in such a dispersion state to polymerize the polymerization groups 613, 613", and 623 of the polymerization surface-active agents 61 and 61" and the second polymerization surface-active agent 62 with each other, as shown in FIG. 6B, a capsule body 50' having a two-layered structure that the first film 51 is coated with the second film 52' formed out of the organic polymer 60'.

Case III

Figure 7A:
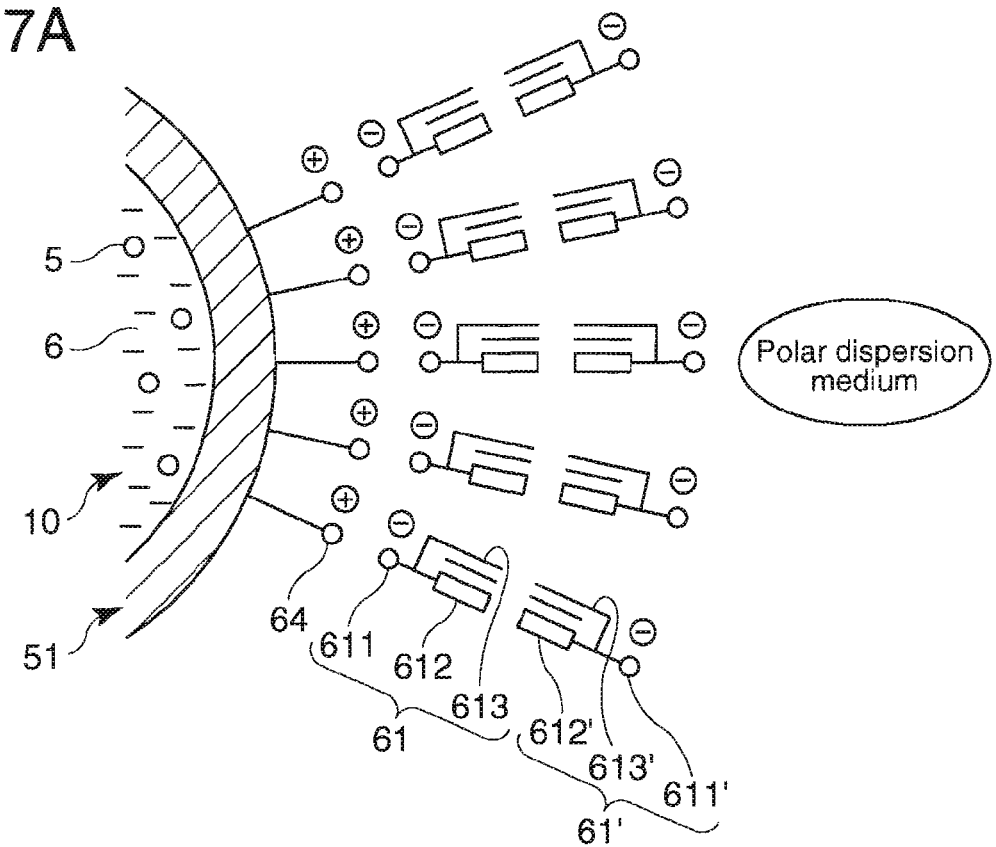
FIGS. 7A and 7B are a diagram illustrating a dispersion state of a dispersion liquid encloser which can appear in the process of manufacturing a microcapsule in Case III and a schematic diagram illustrating the microcapsule having organic polymers obtained by polymerizing monomers, respectively.

FIG. 7A is a diagram illustrating a dispersion state of the dispersion liquid encloser which can appear in the process of manufacturing the microcapsule 40 of Case III.

In Case III, the first film 51 has the plus electric charges 64 on the outer surface thereof and the first film 51 is covered with a polymerization surface-active agent 61 having a polar group opposite to that of the electric charges 64, that is, an anionic group 611, a hydrophobic group 612, and a polymerization group 613.

In this state, the first film 51 having the plus electric charges 64 is dispersed in the polar dispersion medium and coexists with the polymerization surface-active agent 61 having the anionic group 611, the hydrophobic group 612, and the polymerization group 613.

In the polymerization surface-active agent 61, the anionic group 611 is aligned toward the outer surface of the first film 51 having the plus electric charges 64 and then is adsorbed thereto with a strong ion bond. The hydrophobic group 612 and the polymerization group 613 of the polymerization surface-active agent 61 are opposed to a hydrophobic group 612' and a polymerization group 613' of another polymerization surface-active agent 61' by means of a hydrophobic interaction and an anionic group 611' is directed in a direction in which the polar dispersion medium exists, that is, in a direction in which the distance from the first film 51 is increased.

Figure 7B:
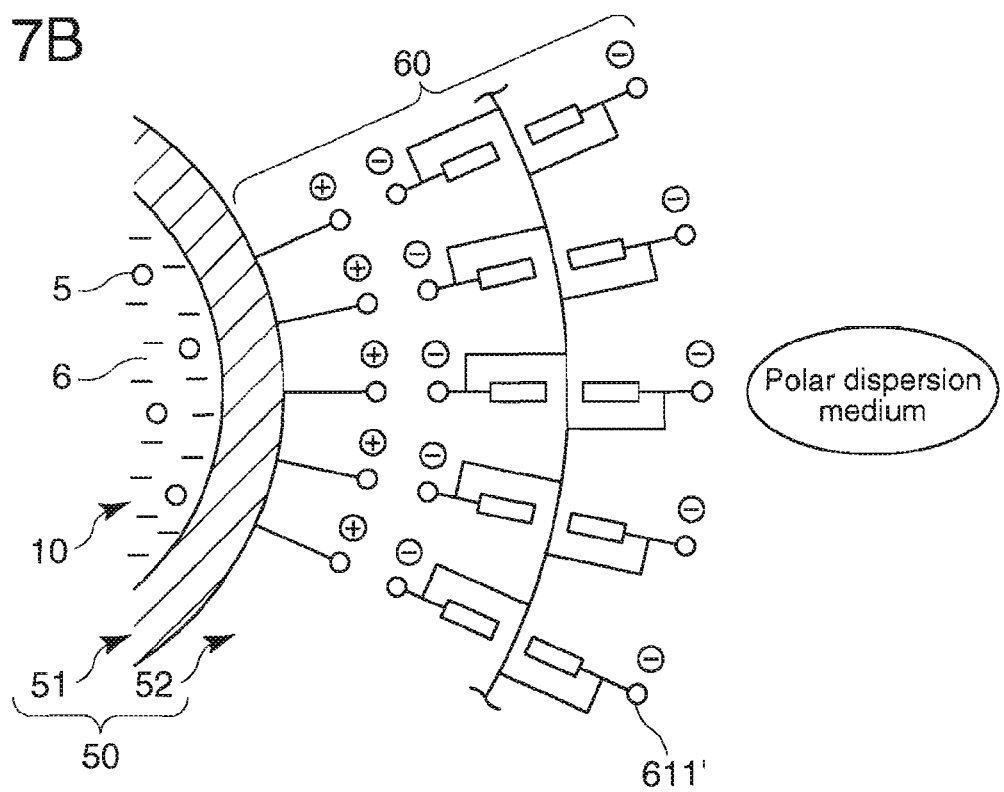

By adding, for example, a polymerization initiator to the polar dispersion medium in such a dispersion state to polymerize the polymerization groups 613 and 613' of the polymerization surface-active agents 61 and 61' with each other, as shown in FIG. 7B, the second film 52 is formed in which the first film 51 is coated with the organic polymer 60 having a repeated structure unit derived from the polymerization surface-active agents 61 and 61'.

As described above, since the second film 52 coats the first film 51, a two-layered capsule body 50 is obtained.

Figure 8A:
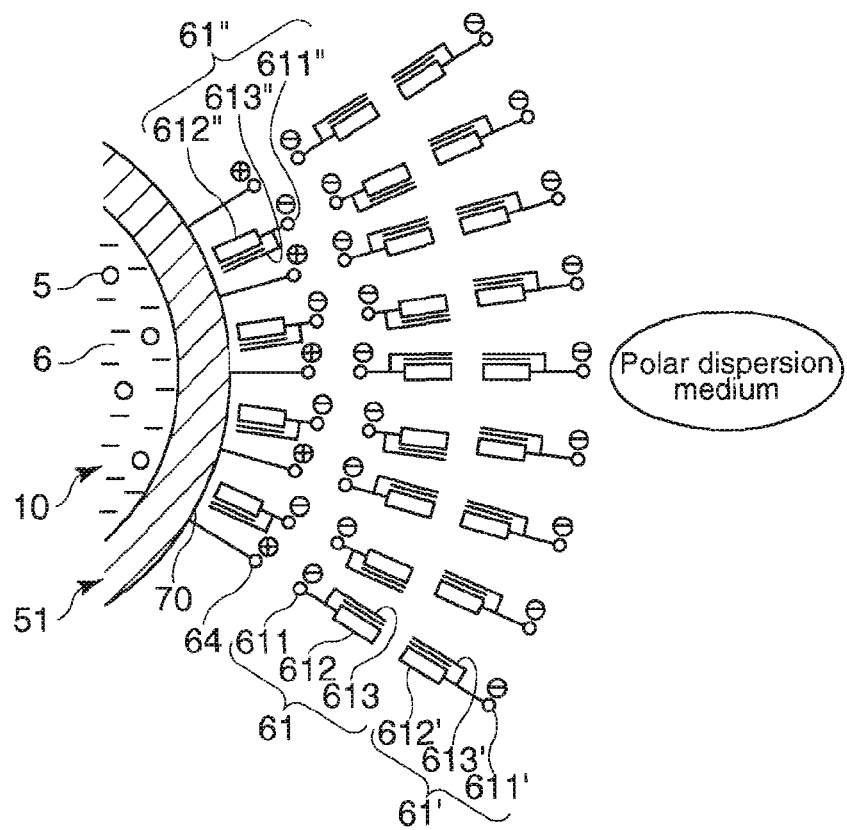
FIGS. 8A and 8B are a diagram illustrating another dispersion state of the dispersion liquid encloser which can appear in the process of manufacturing the microcapsule in Case III and a schematic diagram illustrating the microcapsule having organic polymers obtained by polymerizing monomers, respectively.

FIG. 8A is a diagram illustrating another dispersion state of the dispersion liquid encloser which can appear in the process of manufacturing the microcapsule 40 of Case III.

In the polymerization surface-active agent 61, the anionic group 611 is aligned toward the outer surface of the first film 51 having the plus electric charges 64 and then is adsorbed thereto with a strong ion bond. The hydrophobic group 612 and the polymerization group 613 of the polymerization surface-active agent 61 are opposed to a hydrophobic group 612' and a polymerization group 613' of another polymerization surface-active agent 61' by means of a hydrophobic interaction and the anionic group 611' is directed in a direction in which the polar dispersion medium exists, that is, in a direction in which the distance from the first film 51 is increased.

The outer surface of the first film 51 has the plus electric charges 64 chemically coupled with a specific density and has a hydrophobic region 70 between the plus electric charges 64. A hydrophobic group 612" and a polymerization group 613" of another polymerization surface-active agent 61" are directed to the hydrophobic region 70. The polymerization surface-active agent 61' is disposed so that the anionic group 611' is opposed to an anionic group 611" of the polymerization surface-active agent 61". The hydrophobic groups 612 and 612" and the polymerization groups 613 and 613" of the polymerization surface-active agents 61 and 61" are opposed to the hydrophobic group 612' and the polymerization group 613" of the polymerization surface-active agent 61', respectively, by means of hydrophobic interactions and the anionic group 611' is directed in a direction in which the polar dispersion medium exists, that is, in a direction in which the distance from the firsts film 51 is increased.

Figure 8B:
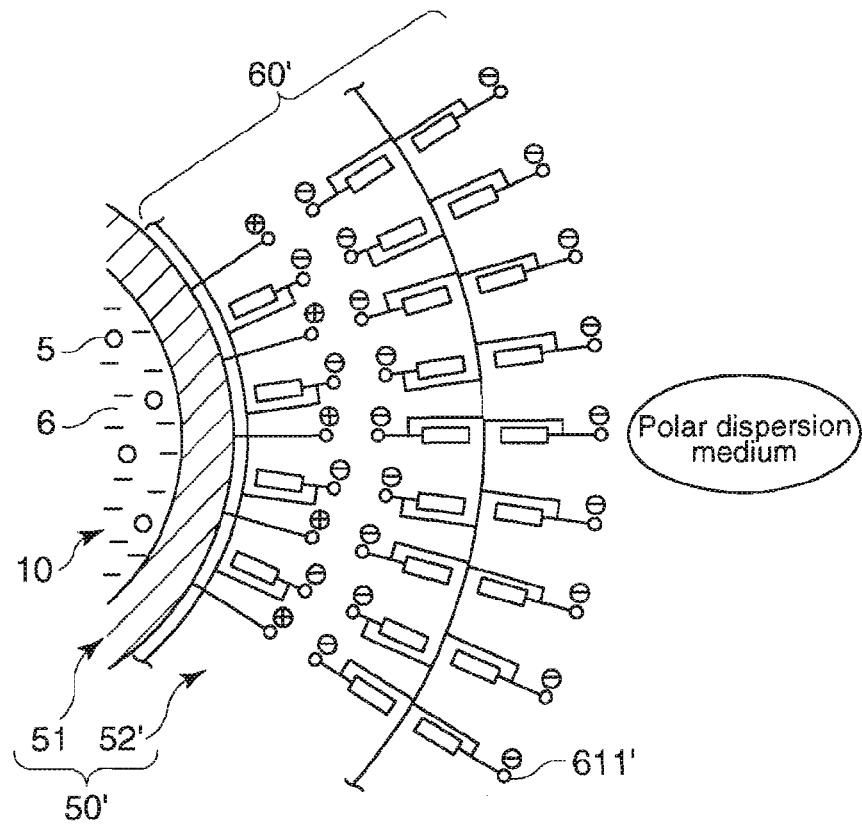

By adding, for example, a polymerization initiator to the polar dispersion medium in such a dispersion state to polymerize the polymerization groups 613, 613', and 613" of the polymerization surface-active agents 61, 61', and 61" with each other, as shown in FIG. 8B, a capsule body 50' having a two-layered structure that the first film 51 is coated with the second film 52' formed out of the organic polymer 60'.

Case IV

Figure 9A:
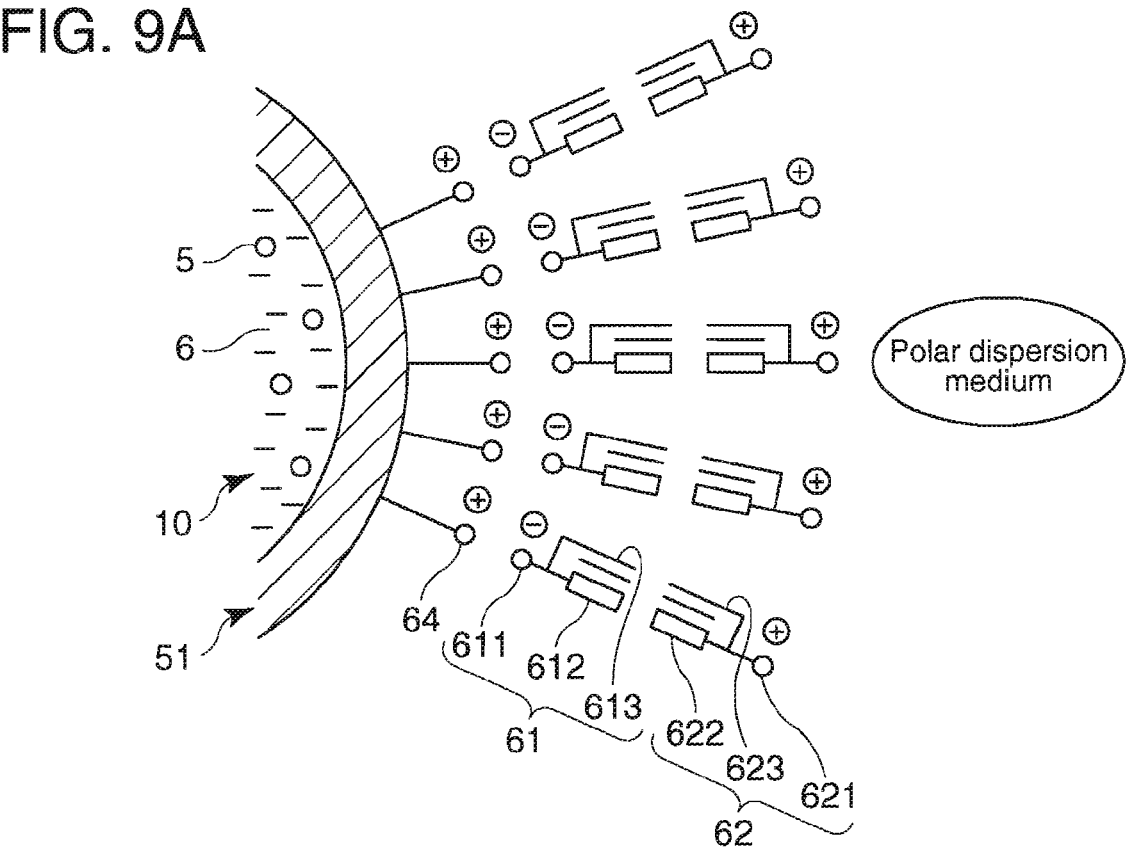
FIGS. 9A and 9B are a diagram illustrating a dispersion state of a dispersion liquid encloser which can appear in the process of manufacturing a microcapsule in Case IV and a schematic diagram illustrating the microcapsule having organic polymers obtained by polymerizing monomers, respectively.

FIG. 9A is a diagram illustrating a dispersion state of the dispersion liquid encloser which can appear in the process of manufacturing the microcapsule 40 of Case IV.

In Case II, the first film 51 has the plus electric charges 64 on the outer surface thereof and the first film 51 is covered with a polymerization surface-active agent 61 having a polar group opposite to that of the electric charges 64, that is, an anionic group 611, a hydrophobic group 612, and a polymerization group 613 and a second polymerization surface-active agent 62 having a polar group equal to that of the electric charges 64, that is, a cationic group 621, a hydrophobic group 622, and a polymerization group 623.

In this state, the first film 51 having the plus electric charges 64 is dispersed in the polar dispersion medium and coexists with the polymerization surface-active agent 61 having the anionic group 611, the hydrophobic group, 612, and the polymerization group 613 and the second polymerization surface-active agent 62 having the cationic group 621, the hydrophobic group 622, and the polymerization group 623.

In the polymerization surface-active agent 61, the anionic group 611 is aligned toward the outer surface of the first film 51 having the minus electric charges 64 and then is adsorbed thereto with a strong ion bond. The hydrophobic group 612 and the polymerization group 613 of the polymerization surface-active agent 61 are opposed to the hydrophobic group 622 and the polymerization group 623 of the second polymerization surface-active agent 62 by means of a hydrophobic interaction and the cationic group 621 is directed in a direction in which the polar dispersion medium exists, that is, in a direction in which the distance from the first film 51 is increased.

Figure 9B:
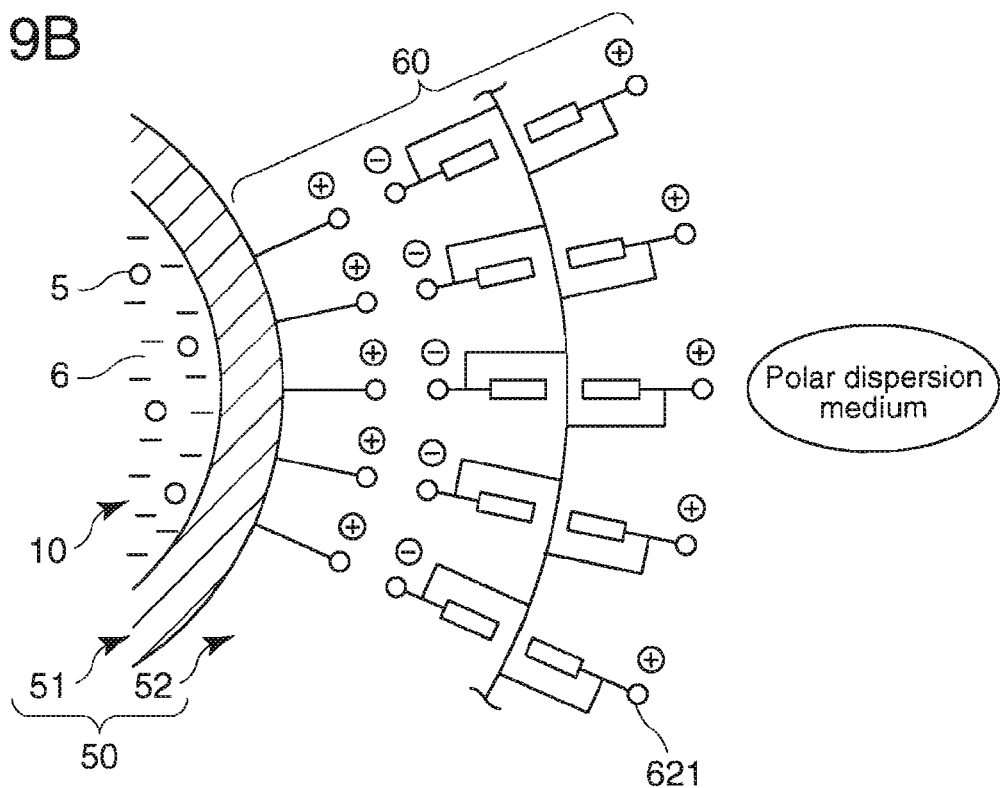

By adding, for example, a polymerization initiator to the polar dispersion medium in such a dispersion state to polymerize the polymerization groups 613 and 623 of the polymerization surface-active agents 61 and 62 with each other, as shown in FIG. 9B, the second film 52 is formed in which the first film 51 is coated with the organic polymer 60 having a repeated structure unit derived from the polymerization surface-active agents 61 and 61 and a repeated structure unit derived from the second polymerization surface-active agent 62.

As described above, since the second film 52 coats the first film 51, a two-layered capsule body 50 is obtained.

Figure 10A:
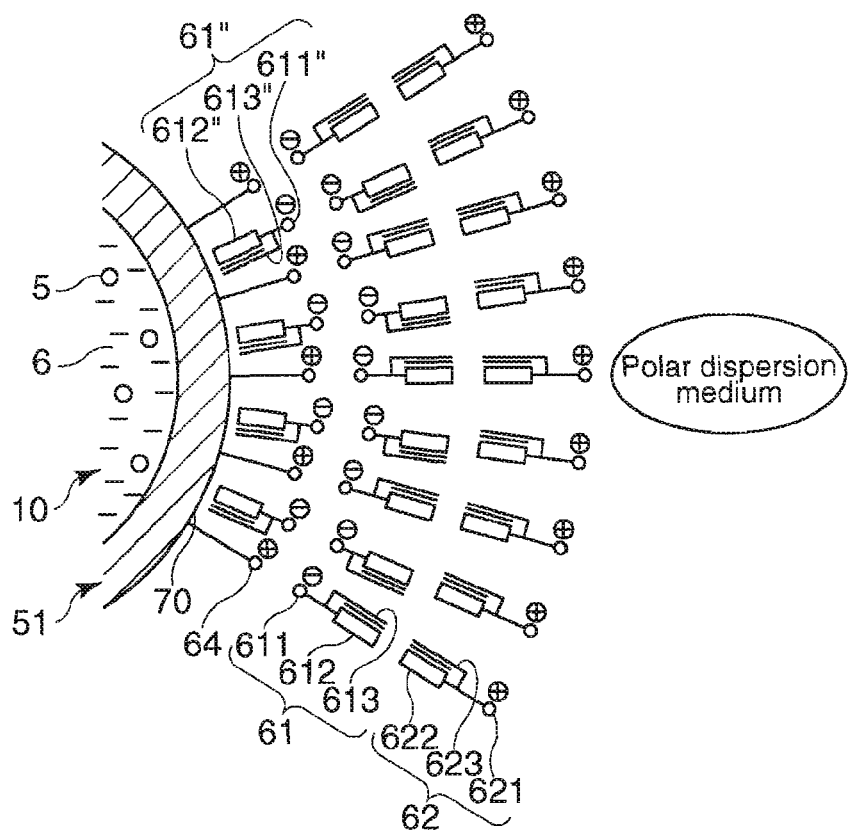
FIGS. 10A and 10B are a diagram illustrating another dispersion state of the dispersion liquid encloser which can appear in the process of manufacturing the microcapsule in Case IV and a schematic diagram illustrating the microcapsule having organic polymers obtained by polymerizing monomers, respectively.

FIG. 10A is a diagram illustrating another dispersion state of the dispersion liquid encloser which can appear in the process of manufacturing the microcapsule 40 of Case IV.

In the polymerization surface-active agent 61, the anionic group 611 is aligned toward the outer surface of the first film 51 having the plus electric charges 64 and then is adsorbed thereto with a strong ion bond. The hydrophobic group 612 and the polymerization group 613 of the polymerization surface-active agent 61 are opposed to the hydrophobic group 622 and the polymerization group 623 of the second polymerization surface-active agent 62 by means of a hydrophobic interaction and the cationic group 621 is directed in a direction in which the polar dispersion medium exists, that is, in a direction in which the distance from the first film 51 is increased.

The outer surface of the first film 51 has the plus electric charges 64 chemically coupled with a specific density and has a hydrophobic region 70 between the plus electric charges 64. A hydrophobic group 612" and a polymerization group 613" of another polymerization surface-active agent 61" are directed to the hydrophobic region 70. The second polymerization surface-active agent 62 is disposed so that the cationic group 621 is opposed to an anionic group 611" of the polymerization surface-active gent 61". The hydrophobic groups 612 and 612" and the polymerization groups 613 and 613" of the polymerization surface-active agents 61 and 61" are opposed to the hydrophobic croup 622 and the polymerization group 623 of the second polymerization surface-active agent 62, respectively, by means of hydrophobic interactions and the cationic group 621 is directed in a direction in which the polar dispersion medium exists, that is, in a direction in which the distance from the first film 51 is increased.

Figure 10B:
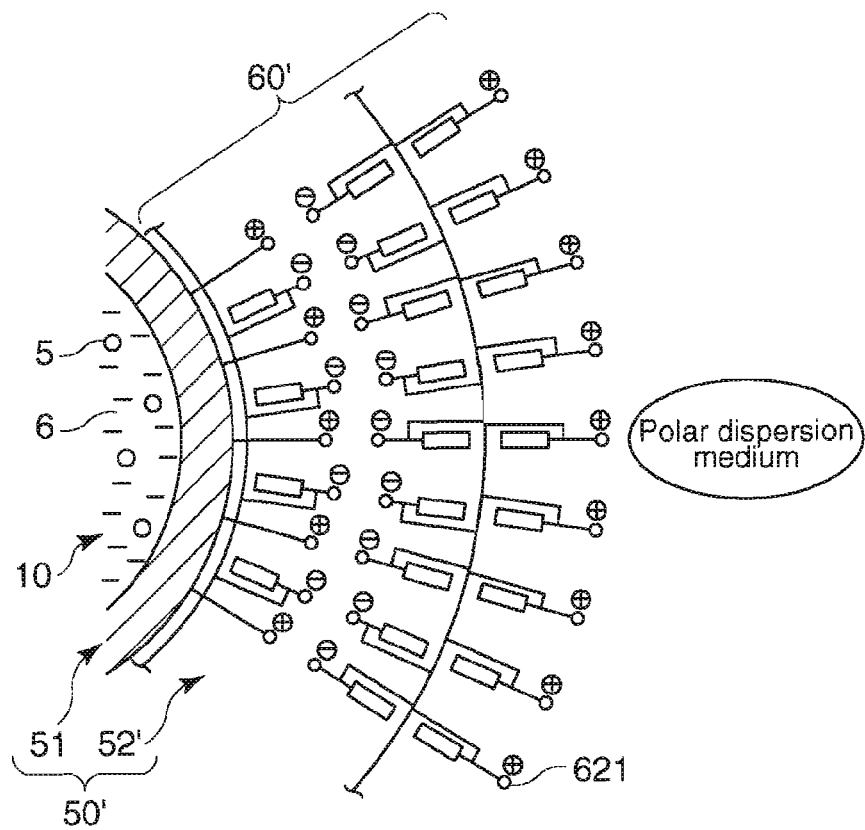

By adding, for example, a polymerization initiator to the polar dispersion medium in such a dispersion state to polymerize the polymerization groups 613, 613", and 623 of the polymerization surface-active agents 61 and 61" and the second polymerization surface-active agent 62 with each other, as shown in FIG. 10B, a capsule body 50' having a two-layered structure that the first film 51 is coated with the second film 52' formed out of the organic polymer 60'.

Hereinafter, the cationic and anionic polymerization surface-active agents (hereinafter, the "polymerization surface-active agents" includes the "second polymerization surface-active agent") which can be used in the invention will be described in detail.

Examples of the cationic group included in the cationic polymerization surface-active agent can include a first-degree amine cationic group, a second-degree amine cationic group, a third-degree amine cationic group, a fourth-degree ammonium cationic group, a fourth-degree phosphonium cationic group, a sulfonium cationic group, and a pyridinium cationic group.

Among them, it is preferable that the cationic group is one selected from a group consisting of the first-degree amine cationic group, the second-degree amine cationic group, the third-degree amine cationic group, and the fourth-degree ammonium cationic group. The cationic group can relatively easily form a micellar structure to be described later.

The hydrophobic group of the cationic polymerization surface-active agent includes preferably at least one of an alkyl group and an aryl group. The organic polymer obtained by polymerizing the polymerization surface-active agent having the hydrophobic group has a high hydrophobic property.

The polymerization group of the cationic polymerization surface-active agent is preferably a radical-polymerizable unsaturated hydrocarbon group. Accordingly, the polymerization group can more easily perform the polymerization reaction.

The radical-polymerizable unsaturated hydrocarbon group is preferably one selected from a group consisting of a vinyl group, an aryl group, an acryloyl group, a methacryloyl group, a propenyl group, a vinylidene group, and a vinylene group. The unsaturated hydrocarbon group can be easily polymerized with a radical. Particularly, the acryloyl group and the methacryloyl group are more preferable.

An example of the cationic polymerization surface-active agent can include a cationic arylic derivative described in JP-B-4-65824. Specific examples of the cationic polymerization surface-active agent can include dimethylaminoethyl methacrylate methyl chloride, dimethylaminoethyl methacrylate benzyl chloride, methacryloyloxy ethyltrimethyl ammonium chloride, diaryldimethyl ammonium chloride, and 2-hydroxy-3-methacryloxy propyltrimethyl ammonium chloride.

Marketed products may be used as the cationic polymerization surface-active agent. Examples thereof can include Acrylester DMC (made by Mitsubishi Rayon Co., Ltd.), Acrylester DML60 (made by Mitsubishi Rayon Co., Ltd.), and C-1615 (made by Dai-Ichi Kogyo Seiyaku Co., Ltd.).

The cationic polymerization surface-active agents exemplified above can be used as a single or a mixture of two or more kinds.

On the other hand, examples of the anionic group of the anionic polymerization surface-active agent can include a sulfonate anionic group ($-SO_3^-$) a sulfinate anionic group ($-RSO_2^-$, examples of which include an alkyl group, a phenyl group, and degenerative materials thereof having a carbon number of 1 to 12), and a carbonic anionic group ($-COO^-$), and the anionic group is preferably one selected front the groups.

The hydrophobic groups similar to the hydrophobic groups of the cationic polymerization surface-active agent described above can be used as the anionic polymerization surface-active agent.

The polymerization groups similar to the polymerization groups of the cationic polymerization surface-active agent can be used as the polymerization group of the anionic polymerization surface-active agent.

Examples of the anionic polymerization surface-active agent can include anionic aryl derivatives described in JP-B-49-46291, JP-B-1-24142, or JP-A-62-104802, anionic propenyl derivatives described in JP-A-62-221431, anionic acrylate derivatives described in JP-A-62-34947 or JP-A-55-11525, and anionic itaconate derivatives described in JP-B-46-34898 or JP-A-51-30284. Specific examples of the anionic polymerization surface-active agent can include a compound expressed by Formula 31 or Formula 32.

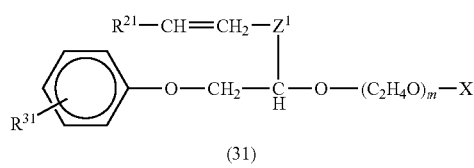

Formula 31

(31)

In Formula 31, $R^{21}$ and $R^{31}$ are independently a hydrogen atom or a hydrocarbon group having a carbon number of 1 to 12, $Z^1$ is a single bond of carbon-carbon or a group expressed by $-CH_2-O-CH_2-$, m is an integer of 2 to 20, X is a group expressed by $SO_3M^1$, and $M^1$ is one of alkali metal, ammonium salt, and alkanol amine.

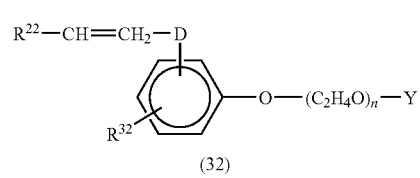

Formula 32

(32)

In Formula 32, $R^{22}$ and $R^{32}$ are independently a hydrogen atom or a hydrocarbon group having a carbon number of 1 to 12, D is a single bond of carbon-carbon or a group expressed by $-CH_2-O-CH_2-$, n is an integer of 2 to 20, Y is a group expressed by $SO_3M^2$, and $M^2$ is one of alkali metal, ammonium salt, and alkanol amine.

The polymerization surface-active agent expressed by Formula 31 is described in JP-A-5-320276 or JP-A-10-316909. By properly adjusting the kinds of $R^{21}$ and the value of X in Formula 31, it is possible to cope with the amount of the electric charges of the first film 51. Examples of the polymerization surface-active agent expressed by Formula 31 can include a compound expressed by Formula 310 and specifically compounds expressed by Formulas 31a to 31d.

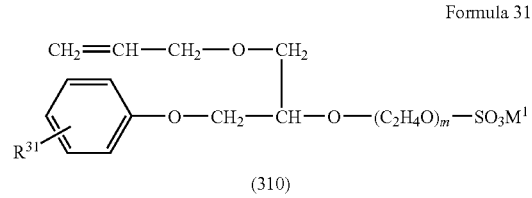

Formula 310

(310)

In Formula 310, $R^{31}$, m, and $M^1$ are similar to those of the compound expressed by Formula 31.

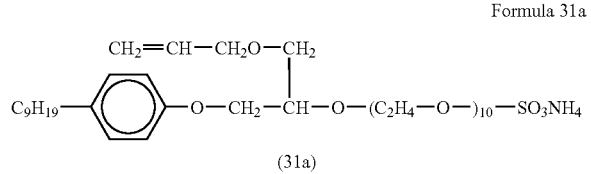

Formula 31a (31a)

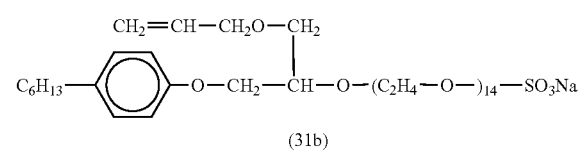

Formula 31b (31b)

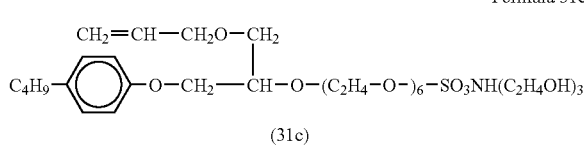

Formula 31c (31c)

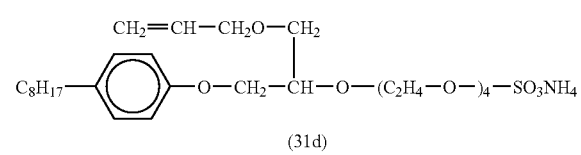

Formula 31d (31d)

Adekaria Soap SE-10N made by Asahi Denka Co., Ltd. is a compound in which $M^1$ is $NH_4$, $R^{31}$ is $C_9H_{19}$, and m is 10 in the compound expressed by Formula 310. Adekaria Soap SE-20N made by Asahi Denka Co., Ltd. is a compound in which $M^1$ is $NH_4$, $R^{31}$ is $C_9H_{19}$, and m is 20 in the compound expressed by Formula 310. The anionic group of the anionic polymerization surface-active agent is preferably a compound expressed by Formula 33.

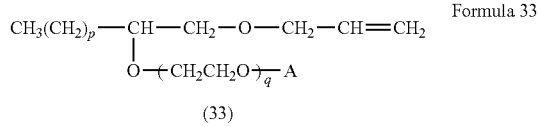

Formula 33

(33)

Here, p is 9 or 11, q is an integer of 2 to 20, A is a group expressed by $—SO_3M^3$, and $M^3$ is one of alkali metal, ammonium salt, and alkanol amine. A specific example of the anionic polymerization surface-active agent expressed by Formula 33 is a compound expressed by the following formula.

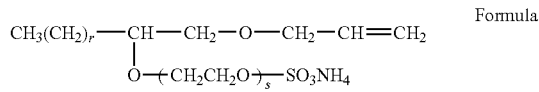

Formula

Here, r is 9 or 11 and s is 5 or 10.

A marketed product can be used as the anionic polymerization surface-active agent. An example thereof can include Aqualon KH series (Aqualon KH-5 and Aqualon KH-10) made by Dai-Ichi Kogyo Seiyaku Co., Ltd. Aqualon KH-5 is a compound in which r is 9 and s is 5 in the compound expressed by the above-mentioned formula, and a compound in which r is 11 and s is 5. Aqualon KH-10 is a compound in which r is 9 and s is 10 in the compound the above-mentioned formula, and a compound in which r is 11 and s is 10.

Further, the anionic polymerization surface-active agent used in the invention is preferably a compound expressed by Formula 34.

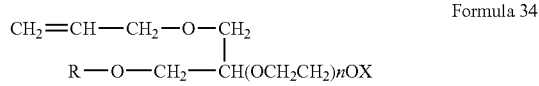

Formula 34

Here, R is an alkyl group having a carbon number of 8 to 15, n is an integer of 2 to 20, X is a group expressed by $—SO_3B$, and B is one of metal, ammonium salt, and alkanol amine.

A marketed product can be used as the anionic polymerization surface-active agent. An example of the marketed product can include Adekaria Soap SE series (Adekaria Soap SR-10, SR-20, and R-1025) (product name) made by Asahi Denka Co., Ltd. The Adekaria Soap SR series are a compound in which B is $NH_4$ in Formula 34, SR is a compound in which n is 10, and SR-20 is a compound in which n is 20.

The anionic polymerization surface-active agent is preferably a compound expressed by Formula A.

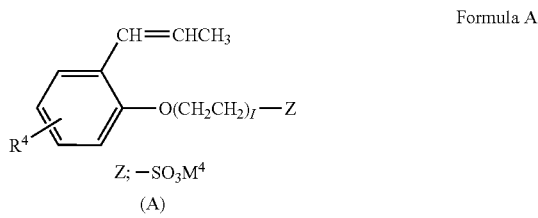

Formula A (A)

Here, R4 is a hydrogen atom or a hydrocarbon group having a carbon number of 1 to 12, I is an integer of 2 to 20, and M4 is one of alkali metal, ammonium salt, and alkanol amine.

A marketed product can be used as the anionic polymerization surface-active agent. An example thereof can include Aqualon HS series (Aqualon HS-10, HS-20, and Aqualon HS-1025) (product name) made by Dai-Ichi Kogyo Seiyaku Co., Ltd. The anionic polymerization surface-active agent used in the invention may be sodium alkylaryl sulfosuccinate expressed by Formula 35.

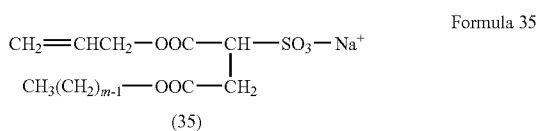

Formula 35

(35)

(m = 12, 16)

A marketed product can be used as the anionic polymerization surface-active agent. The example of the marketed product is Eleminol JS-2 made by Sanyo Chemical Industries Ltd., which is a compound in which m is 12 in Formula 35.

An example of the anionic polymerization surface-active agent used in the invention is sodium methacryloyloxy polyoxy alkylene ester sulfonate expressed by Formula 36. In the following formula, n is an integer of 1 to 20.

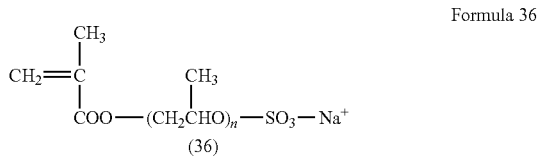

Formula 36

(36)

A marketed product can be used as the anionic polymerization surface-active agent. An example of the marketed product is Eleminol RS-30 made by Sanyo Chemical Industries Ltd., which is a compound in which n is 9 in Formula 36.

An example of the anionic polymerization surface-active agent used in the invention is a compound expressed by Formula 37.

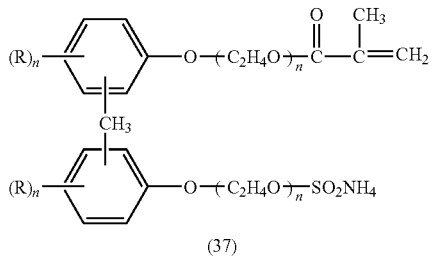

Formula 37

(37)

A marketed product may be used as the anionic polymerization surface-active agent and an example thereof is Antox MS-60 made by Nippon Nyukazai Co., Ltd.

The anionic polymerization surface-active agents described hitherto may be used as a simplex or a mixture of two or more kinds.

The organic polymer 60 has preferably a repeated structure unit derived from a hydrophobic monomer. Accordingly, the moisture resistance of the capsule body 50 can be improved, thereby preventing the deterioration of the electrophoretic dispersion liquid 10 due to contact with moisture.

The hydrophobic monomer has at least a hydrophobic group and a polymerization group in its molecular structure. Since such a hydrophobic monomer is provided, it is possible to improve the hydrophobic property and the polymerization property of the organic polymer 60. As a result, it is possible to improve the mechanical strength, the flexibility, and the weather resistance of the organic polymer 60.

The hydrophobic group may contain at least one of an aliphatic hydrocarbon group, an alicyclic hydrocarbon group, and an aromatic hydrocarbon. Since the organic polymer 60 contains the hydrophobic monomer having the hydrophobic group, the hydrophobic property, that is, the moisture resistance thereof, can be improved.

Examples of the aliphatic hydrocarbon group can include a methyl group, an ethyl group, and a propyl group, examples of the alicyclic hydrocarbon group can include a cyclohexyl group, a dicyclopentenyl group, a dicyclopentanyl group, and an isobornyl group, and examples of the aromatic hydrocarbon group can include a benzyl group, a phenyl group, and a naphthyl group.

The polymerization group is preferably a radical-polymerizable unsaturated hydrocarbon group, which is preferably one selected from a group consisting of a vinyl group, an aryl group, an acryloyl group, a methacryloyl group, a propenyl group, a vinylidene group, and a vinylene group. Accordingly, the polymerization group can be easily polymerized.

Specific examples of the hydrophobic monomer can include monomers having: styrene, methyl styrene, diethyl styrene, chlorostyrene, dichlorostyrene, bromostyrene, p-chloromethyl styrene, and styrene derivatives such as divinyl benzene; monofunctional acrylate esters such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, and isobornyl acrylate; monofunctional methacrylate esters such as methyl methacrylate, ethyl methacrylate, n-butyl methacrylate, diethylhexyl methacrylate, butoxymethyl methacrylate, benzyl methacrylate, phenyl methacrylate, phenoxyehtyl methacrylate, cyclohexyl methacrylate, dicyclopentanyl methacrylate, dicyclopentenyl methacrylate, dicyclopentenyloxyethyl methacrylate, tetrahydrofurfuryl methacrylate, and isobornyl methacrylate; aryl compounds such as aryl benzene, aryl-3-cyclohexane propionate, 1-aryl-3,4-dimethoxy benzene, arylphenoxy acetate, arylphenyl acetate, arylcyclohexane, and polyvalent aryl carbonate; esters such as fumaric acid, maleic acid, and itaconic acid; and radical polymerization groups such as N-substituted imide maleate and cyclic olefin. The hydrophobic monomer is properly selected so as to satisfy the requirement and the amount of addition thereof is arbitrarily determined.

The organic polymer 60 has preferably a repeated structure unit derived from a cross-linking monomer and/or a repeated structure unit derived from a monomer expressed by General Formula 1.

Here, $R^1$ is a hydrogen atom or a methyl group, $R^2$ is one of a t-butyl group, an alicyclic hydrocarbon group, an aromatic hydrocarbon group, and a heterocyclic group, m is an integer of 0 to 3, and n is 0 or 1.

Since the organic polymer 60 has the repeated structure unit derived from the cross-linking monomer to form a dense cross-linking structure in the polymer, it is possible to surely prevent the electrophoretic dispersion liquid 10 or the pigments contained in the electrophoretic dispersion liquid 10 from contacting gas such as oxygen having high activity. Further, since the UV absorbing rate of the organic polymer 60 is enhanced, it is possible to further reduce the amount of UV reaching the electrophoretic dispersion liquid 10. As a result, it is possible to suppress or prevent the deterioration and the fading of color of the electrophoretic dispersion liquid 10 or the pigments due to oxygen or UV.

Since the organic polymer 60 has the repeated structure unit derived from the monomer expressed by General Formula 1, the flexibility of molecules of the organic polymer 60 is decreased by the $R^2$ group which is a "large-volumed" group. That is, since the movement of molecules is restricted, the mechanical strength and the heat resistance of the organic polymer 60 are improved and thus the capsule body 50 having a layer made of the organic polymer 60 can have excellent abrasion resistance and durability. Since the $R^2$ group which is a "large-volumed" group is contained in the organic polymer 60, the capsule body 50 has excellent solvent resistance.

In General Formula 1, examples of the alicyclic hydrocarbon group indicated by $R^2$ can include a cycloalkyl group, a cycloalkenyl group, an isobornyl group, a dicyclopentanyl group, a dicyclopentenyl group, an adamantane group, and a tetrahydrofuran group.

A specific example of the cross-linking monomer has two or more unsaturated hydrocarbon groups including one or more kinds selected from a vinyl group, an aryl group, an acryloyl group, a methacryloyl group, a propenyl group, a vinylidene group, and a vinylene group. Examples thereof can include ethylene glycol acrylate, diethylene glycol diacrylate, triethylene glycol acrylate, tetraethylene glycol diacrylate, polyethylene glycol acrylate, aryl acrylate, bis(acryloxyethyl)hydroxyethyl isocyanurate, bis(acryloxy neopentyl glycol)adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxy propane, 2,2-bis(4-(acryloxy)phenyl, propane, 2,2-bis(4-(acryloxyethoxy)phenyl)propane, 2,2-bis(4-(acryloxyethoxypolyethoxy)phenyl)propane, hydroxyl vibarinate neopentyl glycol diacrylate, 1,4-butanediol diacrylate, dicyclopentanyl diacrylate, dipentaerythritol hexa acrylate, dipentaerythritol monohydroxy pentacrylate, ditrimethylolpropane tetracarylate, pentaerythritol triacrylate, tetrabromobisphenol A diacrylate, triglycerol diacrylate, triglycerol diacrylate, trimethylol propane triacrylate, tris(acryloxyethyl)isocyanurate, ethylene glycol methacrylate, diethylene glycol methacrylate, triethylene glycol methacrylate, tetraethylene glycol methacrylate, polyethylene glycol methacrylate, propylene glycol dimethacrylate, polypropylene glycol dimethacrylate, 1,3-butylene glycol dimethacrylate, 1,4-methacrylate, 1,6-hexanediol dimethacrylate, neopentyl glycol dimethacrylate, 2-hydroxy-1,3-dimethacryloxy propane, 2,2-bis(4-(methacryloxy)phenyl)propane, 2,2-bis(4-(methacryloxyethoxy)phenyl)propane, 2,2-bis(4-(methacryloxyethoxydiethoxy)phenyl)propane, 2,2-bis(4-methacryloxyethoxypolyethoxyphenyl)phenyl)propane, tetrabromobisphenol A dimethacrylate, dicyclopentanyl dimethacrylate, dipentaerythritol hexamethacrylate, glycerol dimethacrylate, hydroxy vibarinate neopentyl glycol dimethacrylate, ditrimethylol propane tetramethacrylate, pentaerythritol trimethacrylate, pentaerythritol tetramethacrylate, triglycerol dimethacrylate, trimethylol propane trimethacrylate, tris(methacryloxyethyl) isocyanurate, arylmethacrylate, divinyl benzene, diaryl phthalate, diaryl terephthalate, diaryl isophthalate, and dimethylene glycol bisaryl carbonate.

Specific examples of the monomer expressed by General Formula 1 can include the followings.

Isobornyl methacrylate

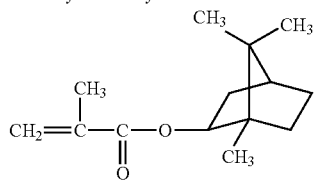

Weather resistance
Homopolymer Tg 155° C.
(180° C.)

Isobornyl methacrylate

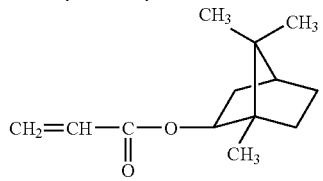

Weather resistance
Homopolymer Tg 94° C.

Dicyclopentenyl acrylate

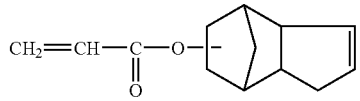

Give adhesion to acryl resin
Homopolymer Tg 120° C.

Dicyclopentenyl acrylate

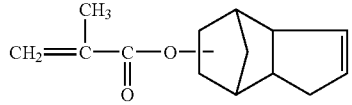

Chemicals resistance

Dicyclopentenyloxyethyl acrylate

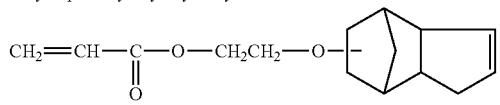

Give adhesion

Dicyclopentanyl acrylate

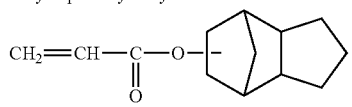

Low moisture-absorbing property
Weather resistance
Homopolymer Tg 120° C.

Dicyclopentenyloxyethyl methacrylate

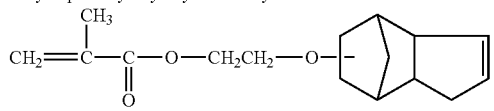

Chemicals resistance

Dicyclopentanyl acrylate

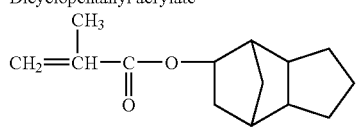

Low moisture-absorbing property
Weather resistance
Homopolymer Tg 175° C.

t-butyl methacrylate

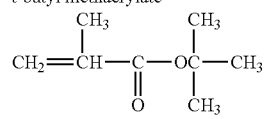

Homopolymer Tg 107° C.

Benzyl methacrylate

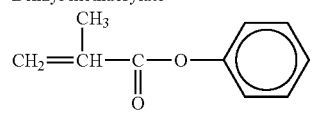

Homopolymer Tg 54° C.

Cyclohexyl methacrylate

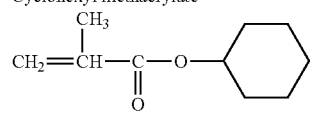

Homopolymer Tg 66° C.

Tetrahydrofurfuryl methacrylate

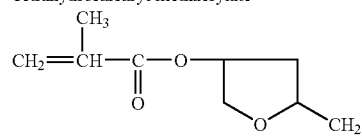

Homopolymer Tg 60° C.

The polymerization surface-active agent used in the second step of the method of manufacturing the microcapsule 40 to be described later may be replaced with or used along with a hydrophilic monomer having a polarity equal to that of the polymerization surface-active agent.

The hydrophilic monomer may have as the hydrophilic group a hydroxyl group, an ethylene oxide group, an amide group, an amino group, or the like. It is considered that the hydrophilic groups are aligned toward the polar dispersion medium on the outer surface of the second film 52 along with the outermost cationic group of the second film 52 and have the same function as the polymerization surface-active agent.

Among the hydrophilic monomers, examples of the cationic hydrophilic monomer can include alkylamino esters of acrylic acid or methacrylic acid such as 2-hydroxyethyl methacrylate, 2-hydroxypropyl methacrylate, and 2-hydroxybutyl methacrylate having a hydroxyl group, ethyl-diethylene glycol acrylate, polyethylene glycol monomethacrylate, and methoxy polyethylene glycol methacrylate having an etheneoxide group, acrylamide and N,N-dimethyl acrylamide having an amide group, and N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate having an amino group; unsaturated amides having an alkylamino group such as N-(2-dimethylaminoethyl)acrylamide, N-(2-dimethylaminoethyl)methacryl amide, and N,N-dimethylaminopropylacryl amide; monovinyl pyridines such as vinyl pyridine; vinyl ethers having an alkylamino group such as dimethylaminoethyl vinyl ether; vinyl imidazole, N-vinyl-2-pyrolidone, and the like.

Examples of the anionic hydrophilic monomer can include as monomer having a carboxyl group acrylic acid, methacrylic acid, crotonic acid, ethacrylic acid, propylacrylic acid, isopropylacrylic acid, 2-acryloyloxy ethyl succinate, 2-acryloyloxyethyl phthalate, 2-methacryloyloxyethyl succinate, 2-methacryloyloxyethyl phthalate, itaconic acid, fumaric acid, and maleic acid. The acrylic acid and the methacrylic acid are preferable. Examples of the monomer having a sulfonate group can include 4-styrene sulfonate and salts thereof, vinyl sulfonate and salts thereof, sulfoethyl acrylate and salts thereof, sulfoethyl methacrylate and salts thereof, sulfoalkyl acrylate and salts thereof, sulfoalkyl methacrylate and salts thereof, sulfopropyl acrylate and salts thereof, sulfopropyl methacrylate and salts thereof, sulfoaryl acrylate and salts thereof, sulfoaryl methacrylate and salts thereof, butyl acrylamide sulfonate and salts thereof, and 2-acrylamide-2-methyl propane sulfonate and salts thereof. An example of the monomer having a phophonate group can include phosphonate-group-containing (meth)acrylate such as phosphoethyl methacrylate.

Next, a method of manufacturing the microcapsule 40 according to the invention will be described.

The method of manufacturing the microcapsule 40 is almost the same whether the type of the microcapsule 40 is any of Cases I to IV, Case I is representatively described hereinafter.

Figure 11A:
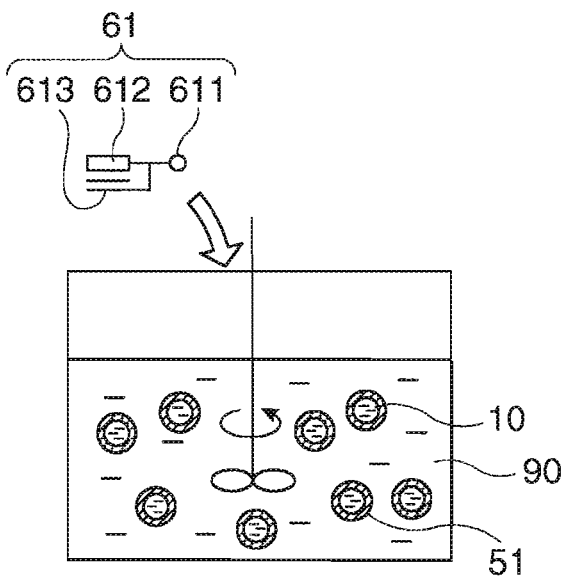
FIGS. 11A, 11B, and 11C are schematic diagrams illustrating a method of manufacturing a microcapsule according to the invention.
Figure 11B:
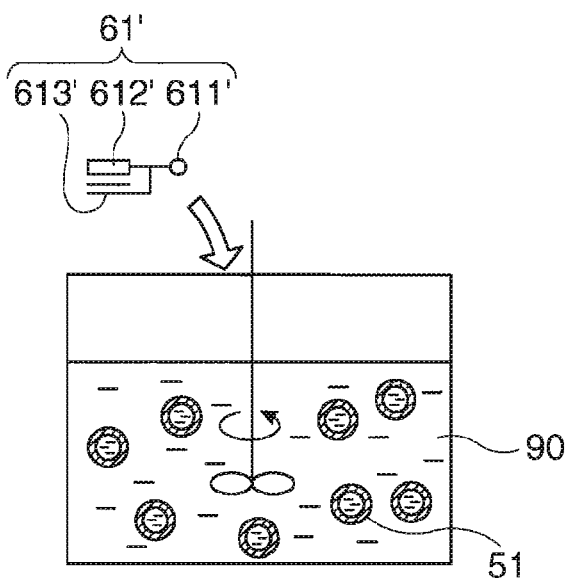
Figure 11C:
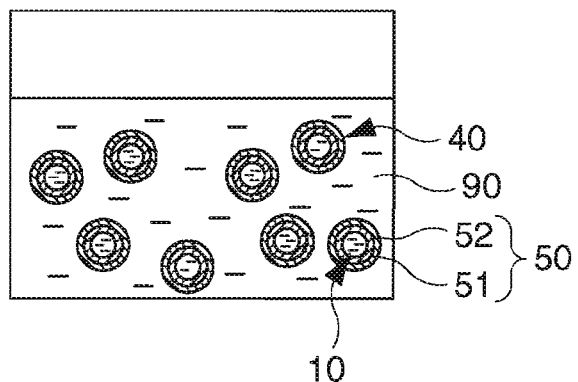

FIGS. 11A, 11B, and 11C are schematic diagrams illustrating a method of manufacturing a microcapsule according to the invention.

The method of manufacturing a microcapsule according to the invention includes a first step of forming the first film having electric charges on the outer surface thereof by adding the polymerization surface-active agent having a polar group having a polarity opposite to that of the electric charges on the outer surface of the first film 51, a hydrophobic group, and a polymerization group to a aqueous dispersion liquid in which the dispersion liquid enclosers are dispersed in the polar dispersion medium by the use of the method described above and mixing the polymerization surface-active agent with the aqueous dispersion liquid; a second step of adding and emulsifying the polymerization surface-active agent and/or hydrophilic monomers having a polar group having the polarity opposite to that of the electric charges on the outer surface of the first film to the aqueous dispersion liquid; and a third step of forming the second film 52 covering the first film 51 by adding a polymerization initiator to the aqueous dispersion liquid to cause a polymerization reaction.

The steps are sequentially described.

1. First, a dispersion liquid encloser containing the electrophoretic dispersion liquid 10 in the first film 51 having the minus electric charges on the outer surface thereof is prepared.

The surface deposition method and/or the surface reaction method described above can be used to form the dispersion liquid encloser (to enclose the electrophoretic dispersion liquid 10 in the first film 51).

2. Next, as shown in FIG. 11A, the dispersion liquid enclosers are added to the polar dispersion medium 90, the polymerization surface-active agent 61 having the polarity opposite to that of the electric charges 64 on the outer surface of the first film 51, that is, the cationic group 611, the hydrophobic group 612, and the polymerization group 613 to the polar dispersion medium 90, and then they are mixed (first step).

At this time, the amount of the cationic polymerization surface-active agent 61 added thereto is preferably in the range of 0.5 to 2 times the total number of moles (=the mass of the first film (g)×amount (mol/g) of polar group having the minus electric charges 64 on the first film 51) of the polar group having the minus electric charges 64 on the outer surface of the first film 51, and more preferably in the range of 0.8 to 1.2 times. Since the added amount is 0.5 times or more, the polymerization surface-active agent 61 can be coupled to the outer surface of the first film 51 having the minus electric charges 64 by a strong ion bond, thereby easily allowing the encapsulation. On the other hand, since the added amount is 2 times or less, the amount of the cationic polymerization surface-active agent 61 not being adsorbed to the first film 51 can be reduced. Accordingly, it is possible to prevent polymer particles (particles having only polymer) not having the first film 51 as a core material from occurring.

A variety of water such as distilled water, ion exchanged water, pure water, ultra pure water, and RO water may be used singly as the polar dispersion medium 90, or the polar dispersion medium 90 in which various lower alcohols such as methanol and ethanol are mixed with water as a major component may be used.

After the cationic polymerization surface-active agent 61 is added to the polar dispersion medium 90, comonomer (the hydrophobic monomer, the cross-linking monomer, and the monomer expressed by General Formula 1) which can be polymerized with the cationic polymerization surface-active agent 61 may be added thereto.

3. Next, as shown in FIG. 11B, a cationic polymerization surface-active agent 61' is added and emulsified to the polar dispersion medium 90 (second step).

Here, instead of the cationic polymerization surface-active agent 61', the hydrophilic monomer having the polarity opposite to that of the electric charges 64 on the outer surface of the first film 51 may be used, or a mixture in which the polymerization surface-active agent 61' and the hydrophilic monomer are mixed at a ratio may be used.

At this time, the amounts of the cationic polymerization surface-active agent 61' and the hydrophilic monomer are preferably in the range of 1 to 10 times the number of moles of the cationic polymerization surface-active agent 61 added in Step 2, and more preferably in the range of 1 to 5 times. Since the added amount is 1 times or more the number of moles, the dense organic polymer 60 can be obtained, thereby accomplishing improvement in weather resistance of the microcapsule 40. On the other hand, since the added amount is 10 times or more the number of moles, the hydrophilic monomer not contributing the encapsulation can be prevented from occurring, thereby preventing polymer particles not having a core material other than the capsule body 50 from occurring.

A variety of cationic hydrophilic monomers described above can be used as the hydrophilic monomers in this step.

4. Next, by adding a polymerization initiator to the polar dispersion medium 90 to cause a polymerization reaction, the second film 52 covering the first film 51 is obtained (third step). Accordingly, it is possible to obtain the microcapsule 40 having the two-layered capsule body 50 containing the electrophoretic dispersion liquid 10.

Here, before the polymerization reaction, the minus electric charges 64 on the outer surface of the first film 51 are bonded in an ionic manner to the cationic groups 611 of the polymerization surface-active agent 61, the hydrophobic groups 612 of the polymerization surface-active agent 61 are opposed to the hydrophobic groups 612' of another polymerization surface-active agent 61', and the cationic groups 611' of the polymerization surface-active agent 61' are aligned toward the polar dispersion medium 90, thereby forming a micellar structure. When the polymerization reaction is performed in this state, the organic polymer 60 maintaining the above-mentioned structure is formed on the surface of the first film 51. That is, the arrangement of the polymerization surface-active agents 61 and 61' existing around the first film 51 before the polymerization reaction is controlled with high precision. With the arrangement controlled with high precision, the polymerization surface-active agents 61 and 61' are converted into the organic polymer 60 by the emulsion polymerization reaction. Accordingly, the structure of the microcapsule 40 according to the invention is controlled with very high precision. That is, since the polymerization surface-active agents 61 and 61' form the micellar structure in which the cationic groups 611' of the outermost polymerization surface-active agent 61' are aligned toward the polar dispersion medium 90 after the minus electric charges 64 on the outer surface of the first film 51 and the cationic groups 611 of the polymerization surface-active agent 61 are bonded in an ionic manner to each other in the polymerization system, and then forms the organic polymer 60 through the polymerization reaction, the arrangement of the monomer existing around the first film 51 before the polymerization reaction affects the polarization state around the first film 51 after the polymerization reaction, and thus it can be said to control the structure with very high precision.

At this time, by raising the temperature of the polar dispersion medium 90 to a predetermined temperature (the temperature where the polymerization initiator is activated) as needed, the polymerization initiator can be activated, thereby smoothly performing the polymerization reaction in liquid.

The polymerization initiator is preferably an aqueous polymerization initiator and examples thereof can include potassium persulphate, ammonium persulphate, sodium persulphate, 2,2-azobis-(2-methylpropion amidine) dihydrochloride, and 4,4-azobis-(4-cyanovalerate).

Here, by the use of the emulsion polymerization method, the cationic polymerization surface-active agents 61 and 61' and the monomers exhibit the following behaviors.

First, by adsorbing the cationic polymerization surface-active agent 61 to the minus electric charges 64 on the outer surface of the first film 51, adding the hydrophobic monomer thereto, and adding and emulsifying the cationic polymerization surface-active agent 61', the arrangement of the cationic polymerization surface-active agents 61 and 61' or the monomers existing around the first film 51 is controlled with very high precision, and the cationic groups 611' are aligned toward the polar dispersion medium 90 at the outermost side. With the arrangement controlled with high precision, the monomers are converted into the organic polymer 60 to form the second film 52 by the emulsion polymerization reaction, thereby obtaining the capsule body 50 according to the first embodiment, that is, the microcapsule 40.

By using the method described above, it is possible to reduce the generation of aqueous oligomer or polymer as a side product. Accordingly, the viscosity of an aqueous dispersion liquid in which the obtained microcapsules 40 are dispersed in the polar dispersion medium 90 can be decreased, thereby easily performing a refining process such as an ultra-filtration process.

The polymerization initiator may be added to the aqueous dispersion liquid, independently of the polymerization surface-active agents or the copolymers.

The polymerization reaction is performed preferably in a reaction vessel having an ultrasonic wave generator, an agitator, a reflux condenser, a funnel, and a thermostat.

In the polymerization reaction, by raising the temperature to a cleavage temperature of the aqueous polymerization initiator added to the reaction system, the polymerization initiator is cleaved to generate initiator radicals. Since the initiator radicals attack the unsaturated groups of the polymerization surface-active agent or the unsaturated groups of the monomers, the polymerization reaction is initiated.

The addition of the polymerization initiator to the reaction system (aqueous dispersion liquid) can be properly performed by dropping an aqueous solution in which the aqueous polymerization initiator is dissolved in pure water into the reaction vessel. At this time, the aqueous solution containing the polymerization initiator may be added to the aqueous dispersion liquid heated to the temperature at which the polymerization initiator is activated, at a time, discretely, or continuously. After adding the polymerization initiator, the aqueous dispersion liquid may be heated to the temperature at which the polymerization initiator is activated.

In the invention, it is preferable that the aqueous polymerization initiator is used as the polymerization initiator as described above and the aqueous solution obtained by dissolving the aqueous polymerization initiator in pure water is dropped and added to the aqueous dispersion liquid in the reaction vessel. Accordingly, the added polymerization initiator is cleaved to generate radicals and the radicals attack the polymerization groups of the polymerization surface-active agent or the polymerization groups of the polymerization monomers, thereby causing the polymerization reaction. The polymerization temperature and the polymerization reaction time are different depending upon the kinds of the polymerization initiator and the kinds of the polymerization monomer, but a desired polymerization condition can be easily set by those skilled in the art.

The activation of the polymerization initiator in the reaction system can be properly performed by raising the temperature of the aqueous dispersion liquid to a predetermined polymerization temperature as described above. The polymerization temperature is preferably in the range of 60 to 90° C. The polymerization reaction time is preferably in the range of 3 to 10 hours.

In the polymerization reaction, the polymerization surface-active agents, the hydrophobic monomers, the cross-linking monomers, the compounds expressed by Genera Formula 1, and other known polymerization monomers can be used in one kind or two or more kinds.

Since the emulsion polymerization reaction is performed by the use of the ionic polymerization surface-active agent, the emulsion state of the mixture liquid containing raw monomers is often good without using emulsifier. Accordingly, it is necessary to use emulsifier, but at least one kind selected from a group consisting of known anionic emulsifier, nonionic emulsifier, and cationic emulsifier as needed.

The microcapsule 40 is obtained through the processes described above.

Since the capsule body 50 is formed out of the organic polymer 60 containing a plurality of hydrophobic groups 612 and 612', the microcapsule 40 has excellent moisture resistance. Accordingly, it is possible to prevent the increase in moisture in the microcapsule 40 with the lapse of time, thereby preventing the deterioration in display performance of the electrophoretic device 20.

Second Embodiment

Figure 12:
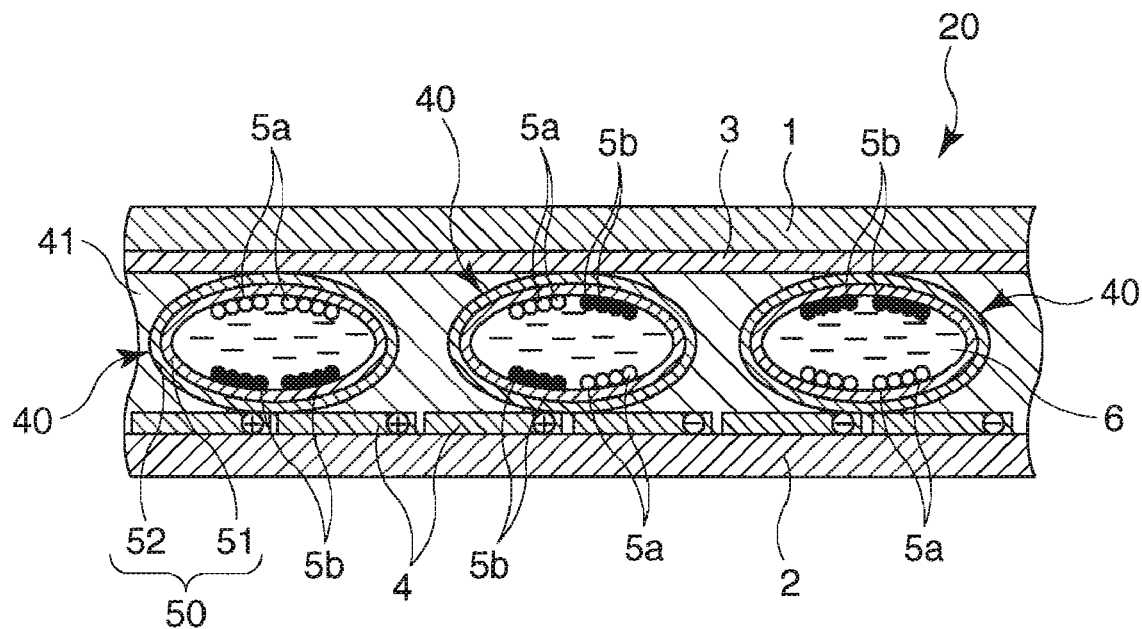
FIG. 12 is a longitudinal-sectional view illustrating an electrophoretic device according to a second embodiment of the invention.

Next, an electrophoretic device according to a second embodiment of the invention will be described. FIG. 12 is a longitudinal-sectional view illustrating the electrophoretic device according to the second embodiment of the invention.

Hereinafter, the electrophoretic device according to the second embodiment is described focusing on the differences from the electrophoretic device according to the first embodiment, and the same elements are not described.

The electrophoretic device 20 according to the second embodiment is similar to the electrophoretic device 20 according to the first embodiment, except that plural kinds of electrophoretic particles having different properties, that is, two kinds of electrophoretic particles 5a and 5b different in color and polarity of electric charges are dispersed in the dispersion medium 6.

In the second embodiment, it is assumed that the electrophoretic particles 5a are charged to plus and are white, and the electrophoretic particles 5b are charged to minus and are black (colored).

In the electrophoretic device 20, when the second electrode 4 is applied with a positive potential, the electrophoretic particles 5a move to the first electrode 3 and gather in the first electrode 3. On the other hand, the electrophoretic particles 5b move no the second electrode 4 and gather in the second electrode 4.

On the contrary, when the second electrode 4 is applied with a negative potential, the electrophoretic, particles 5a move to the second electrode 4 and gather in the second electrode 4. On the other hand, the electrophoretic particles 5b move to the first electrode 3 and gather in the first electrode 3.

Accordingly, as shown in FIG. 12, by means of combination of polarities of the second electrode 4, the color (white) of the electrophoretic particles 5a is visible from the left microcapsule 40, a color (gray) in which the color of the electrophoretic particles 5a and the color of the electrophoretic particles 5b are mixed is visible from the central microcapsule 40, and the color (black) of the electrophoretic particles 5b is visible from the right microcapsule 40, respectively, when the electrophoretic device 20 is seen from the upside (the display plane side).

According to the configuration of the electrophoretic device 20 described above, it is possible to display an image with a larger number of gray scales.

In the configuration shown in the figures, the electrophoretic particles 5a and the electrophoretic particles 5b of which the numbers are equal to each other are dispersed in the dispersion medium 6, but the number can be properly set as needed.

The average diameters of the electrophoretic particles 5a and the electrophoretic particles 5b may be equal to each other or different from each other.

By using a kind of electrophoretic particles for each microcapsule 40, the kinds of electrophoretic particles may be different every microcapsule 40.

According to the electrophoretic device 20 according to the second embodiment, the same advantages as the first embodiment can be obtained, Third Embodiment Next, an electrophoretic device according to a third embodiment of the invention will be described.

Figure 13:
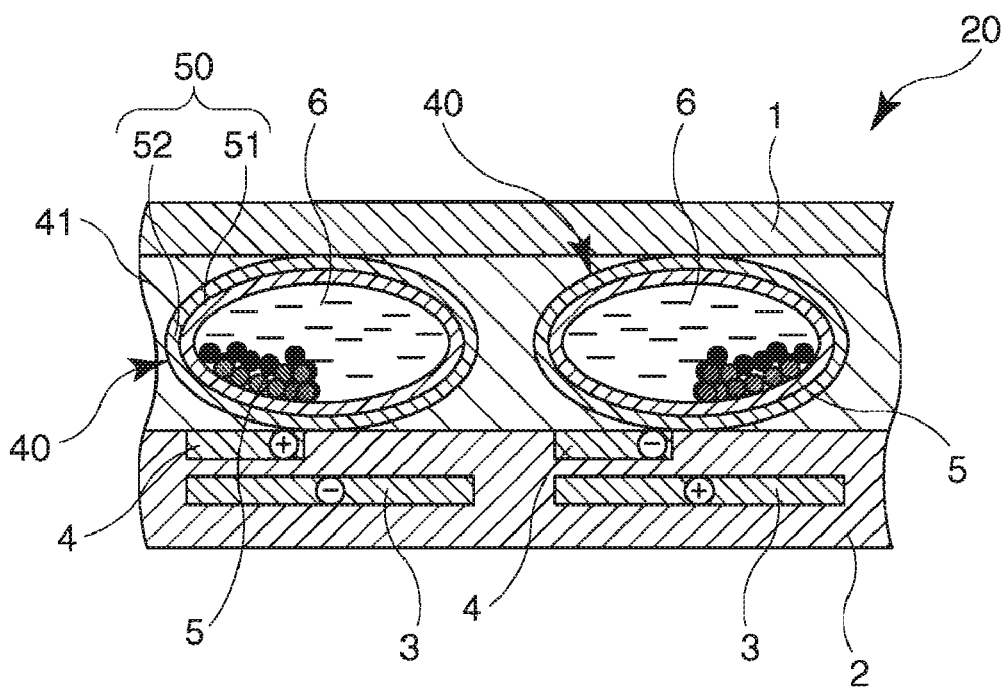
FIG. 13 is a longitudinal-sectional view illustrating an electrophoretic device according to a third embodiment of the invention.

FIG. 13 is a longitudinal-sectional view illustrating the electrophoretic device according to the third embodiment of the invention.

Hereinafter, the electrophoretic device according to the third embodiment is described focusing on the differences from the electrophoretic device according to the first embodiment, and the same elements are not described.

The electrophoretic device 20 according to the third embodiment is similar to the electrophoretic device 20 according to the first embodiment, except that the configurations (arrangement and the like) of the first electrode 3 and the second electrode 4 are different from each other.

That is, in the third embodiment, the first electrode 3 having a size larger than that of the second electrode 4 is provided on the second substrate 2 so as to overlap with the second electrode 4.

In the third embodiment, it is assumed that the electrophoretic particles are charged to plus and are black (colored), the second substrate 2 is white, and the second electrode 4 is black (colored).

In the electrophoretic device 20, when the second electrode 4 is applied with a positive potential, the electrophoretic particles 5 move to the second electrode 4 and gather in the second electrode 4.

On the contrary, when the second electrode 4 is supplied with a negative potential, the electrophoretic particles move to the first electrode 3 which is exposed from the second electrode 4 and gather in the exposed portion.

Accordingly, as shown in FIG. 13, by means of combination of polarities of the second electrode 4, the left is black by the color of the electrophoretic particles 5 and the right is white by the color of the second substrate 2 in the left microcapsule 40, and black is visible as a whole by the color of the electrophoretic particles 5 and the color of the second electrode 4 in the right microcapsule 40, respectively, when the electrophoretic device 20 is seen from the upside (the display plane side).

In the electrophoretic device 20, even after the supply of a voltage to the first electrode 3 and the second electrode 4 is stopped, the electrophoretic particles 5 are held in the state that the electrophoretic particles are attracted to the first electrode 3 in the left microcapsule 40 by means of an electrostatic force (attractive force) generated from the overlapping portion of the first electrode 3 and the second electrode 4, and the electrophoretic particles are held in the state that the electrophoretic particles are repulsed to the first electrode 3 by means of an electrostatic force (repulsive force) generated from the overlapping portion of the first electrode 3 and the second electrode 4, In the electrophoretic device 20, by adjusting the magnitude of the voltage applied to the electrodes 3 and 4, the application time of the voltage, and the like, it is possible to control the amount of movement of the electrophoretic particles 5 between the second electrode 4 and the portion of the first electrode 3 exposed from the second electrode 4, thereby displaying an image with multi gray scales.

In the electrophoretic device 20 according to the third embodiment, it is possible to obtain the same advantages as the first embodiment.

The electrophoretic device 20 described above can be built in a variety of electric apparatuses. Hereinafter, electric apparatuses according to the invention including the electrophoretic device 20 will be described.

Electronic Paper

First, an example in which an electric apparatus according to the invention is applied to an electronic paper will be described.

Figure 14:
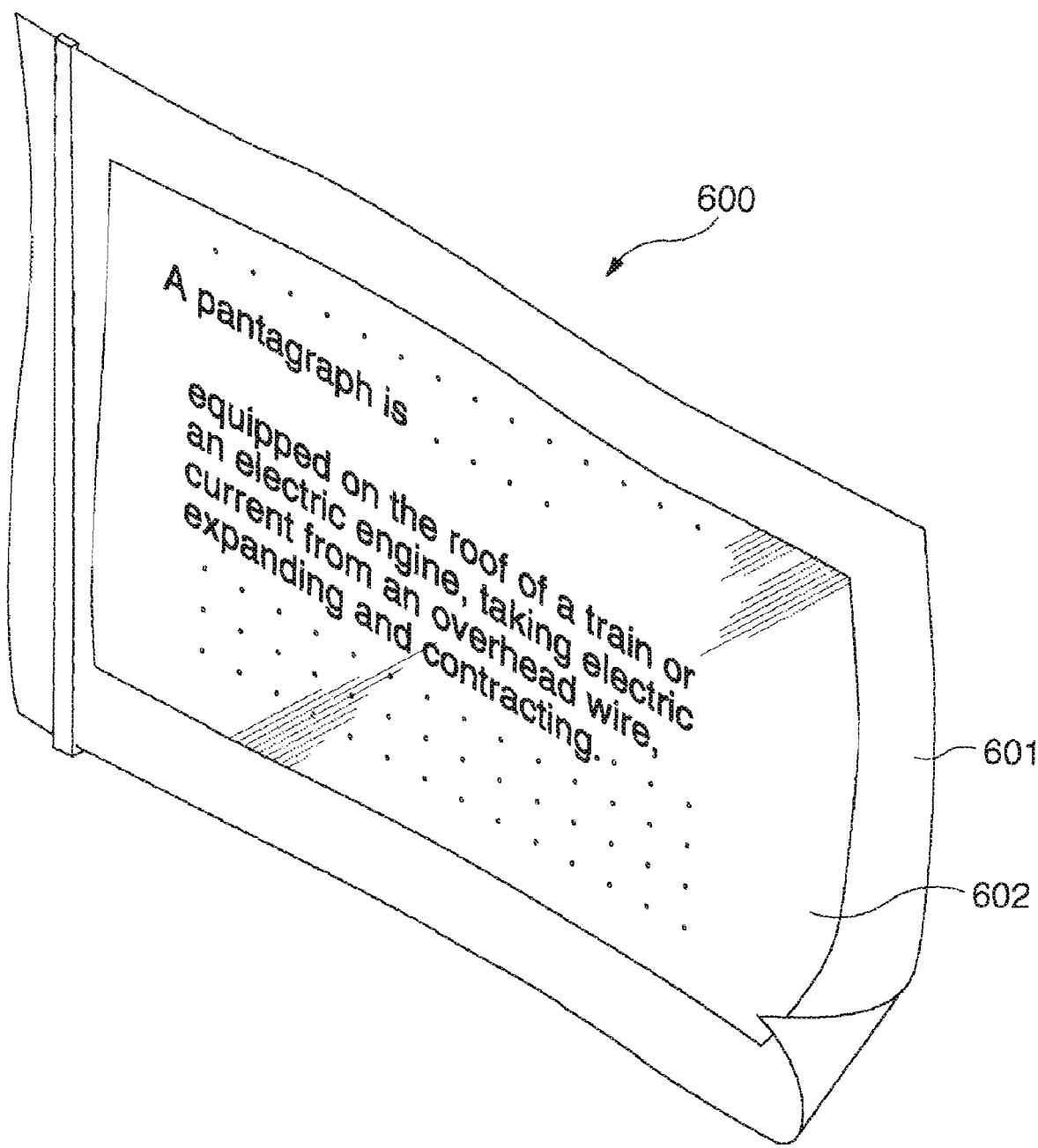
FIG. 14 is a perspective view illustrating an example in which an electric apparatus according to the invention is applied to an electronic paper.

FIG. 14 is a perspective view illustrating an example in which the electric apparatus according to the invention is applied to the electronic paper.

The electronic paper 600 shown in FIG. 14 includes a main body 601 made of a rewritable sheet having texture and flexibility similar to paper and a display unit 602.

In the electronic paper 600, the display unit 602 includes the electrophoretic device 20 described above.

Display

Next, an example in which the electric apparatus according to the invention is applied to a display will be described.

Figure 15A:
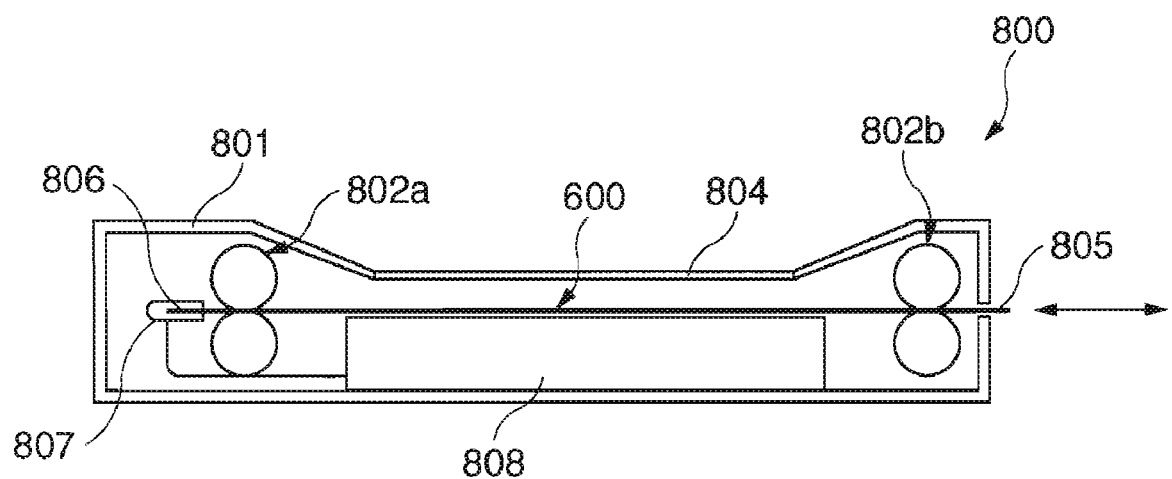
FIGS. 15A and 15B are diagrams illustrating an example in which an electric apparatus according to the invention is applied to a display.
Figure 15B:
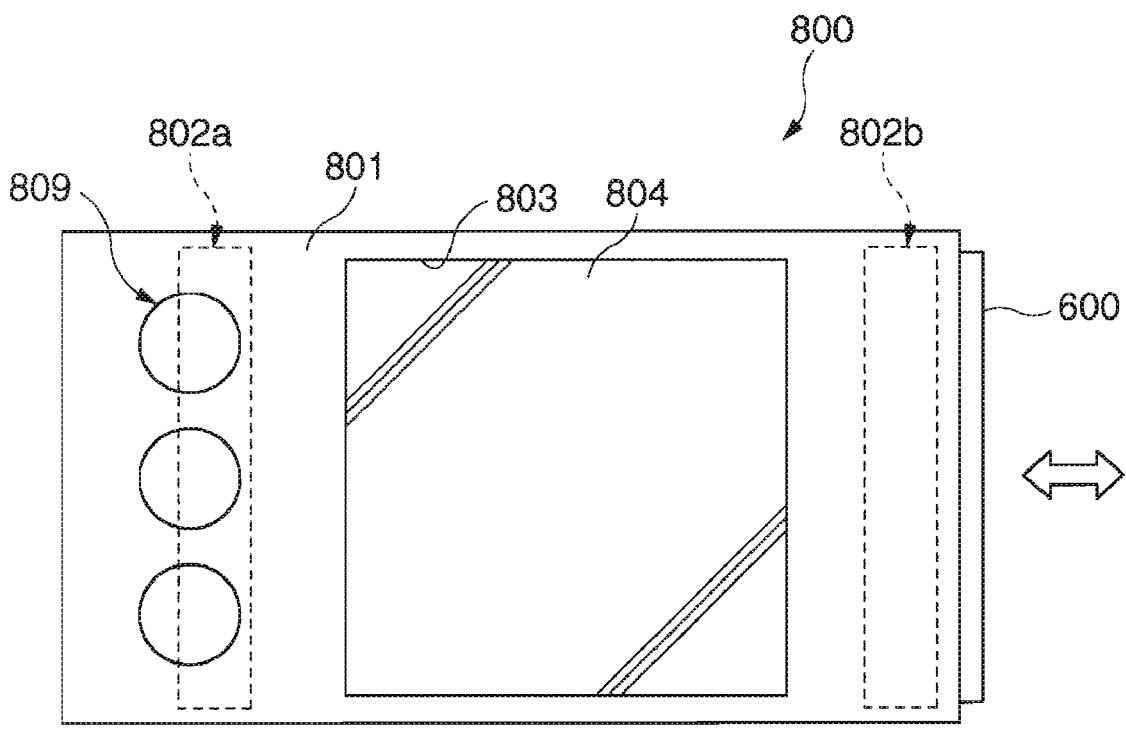

FIGS. 15A and 15B are diagrams illustrating examples in which the electric apparatus according to the invention is applied to a display, where FIG. 15A is a cross-sectional view and FIG. 15B is a plan view.

The display (display device) 800 shown in FIG. 15 includes a main body 801 and an electronic paper 600 in which is provided to be detachable from the main body 801. The electronic paper 600 has the same configuration as described above, that is, the configuration shown in FIG. 15.

In the main body 801, an insertion opening 805 through which the electronic paper 600 can be inserted is formed in one side thereof (right side in FIGS. 15A and 15B) and two transfer roller pairs 802a and 802b are provided therein. When the electronic paper 600 is inserted into the main body 801 through the insertion opening 805, the electronic paper 600 is installed in the main body 801 in the state that it is held between the transfer roller pairs 802a and 802b.

A rectangular opening 803 is formed in a display plane (the front paper surface in FIG. 15A) of the main body 801, and a transparent glass plate 804 is fitted to the opening 803. Accordingly, the electronic paper 600 installed in the main body 801 can be seen from the outside of the main body 801. That is, in the display 800, the display plane is constructed so that the electronic paper 600 installed in the main body 801 can be seen through the transparent glass plate 804 with naked eyes.

A terminal portion 806 is provided at the front end (left side in FIGS. 15A and 15B) in the insertion direction of the electronic paper 600, and a socket 807, which is connected to the terminal portion 806 in the state that the electronic paper 600 is installed in the main body, is provided in the main body 801. The socket 807 is electrically connected to a controller 808 and a manipulation portion.

In the display 800, the electronic paper 600 is detachable from the main body 801 and may be detached and carried from the main body 801 for use.

In the display 800, the electronic paper 600 includes the electrophoretic device 20 described above.

The electric apparatus according to the invention is not limited to those described above, and examples thereof can include a television, a view finder type or monitor direct-view type video tape recorder, a car navigation apparatus, a pager, an electronic pocketbook, an electronic calculator, an electronic newspaper, a word processor, a personal computer, a work station, a television phone, a POS terminal, an apparatus having a touch panel, and the like. The electrophoretic device 20 according to the invention can be used in the display unfits of the electric apparatuses.

The electrophoretic device and the electric apparatus according to the invention have been hitherto described with reference to the embodiments shown in the figures, but the invention is not limited to the embodiments.

The electrophoretic device according to the invention may be constructed by combining two or more configurations (features) selected from the embodiments described above.

EXPERIMENTAL EXAMPLES

Specific experimental examples of the invention will be described now.

1. Manufacturing Electrophoretic Device

Experimental Example 1

1. Electrophoretic particles with an average diameter of 0.5 µm are dispersed in dodecyl benzene in which anthraquinone blue is dissolved to be 10 wt %, thereby preparing an electrophoretic dispersion liquid. $TiO_2$ particles of which the surfaces are reformed by a coupling accent are used as the electrophoretic particles.

2. A solution in which gum Arabic with an isoelectric point of about pH 1.5 and gelatin with an isoelectric point of about pH 4.8 are dissolved is prepared and the electrophoretic dispersion liquid 10 formed in Process 1 is added to the solution and is stirred, thereby forming an emulsion. The emulsion is a fluid in which the electrophoretic dispersion liquid 10 is dispersed in the solution.

Next, acetate is dropped in the fluid and pH thereof is adjusted in the range of 4.0 to 4.3. Since the gum Arabic and the gelatin are charged to plus in the range of pH lower than the isoelectric points, respectively, and are charged to minus in the range of pH higher than the isoelectric points, the gelatin is first charged to plus with the dropping of the acetate. Since the gum Arabic is charged to minus in the range of pH of 4.0 to 4.3, coacervate is produced by means of neutralization of electric charges.

Thereafter, formalin is added to the fluid, thereby fixing a gelatin wall by means of a cross-linking reaction of the gelatin and an amino group. By the use of the coacervation method, a dispersion liquid encloser in which the electrophoretic dispersion liquid 10 is enclosed in a complex material body (first film 51) of the gum Arabic and the gelatin is obtained. The obtained dispersion liquid encloser is recovered by filtering. OH groups (—OH), COOH groups (—COOH), and the like of the gum Arabic and the gelatin appear on the outer surfaces of the dispersion liquid encloser (first film).

3. Ammonia, the obtained dispersion liquid encloser, and a dimethyl amino ethylmethyl chloride methacrylate (cationic polymerization surface-active agent 61) expressed by Formula 38 are added and stirred to pure water (polar dispersion medium), thereby forming a mixture liquid. Here, Formula 38 is simplified to "$X^+Cl^-$."

(38)

Here, reactions of Formulas 39 and 40 are carried out in the mixture.

(39)

(40)

Figure 16:
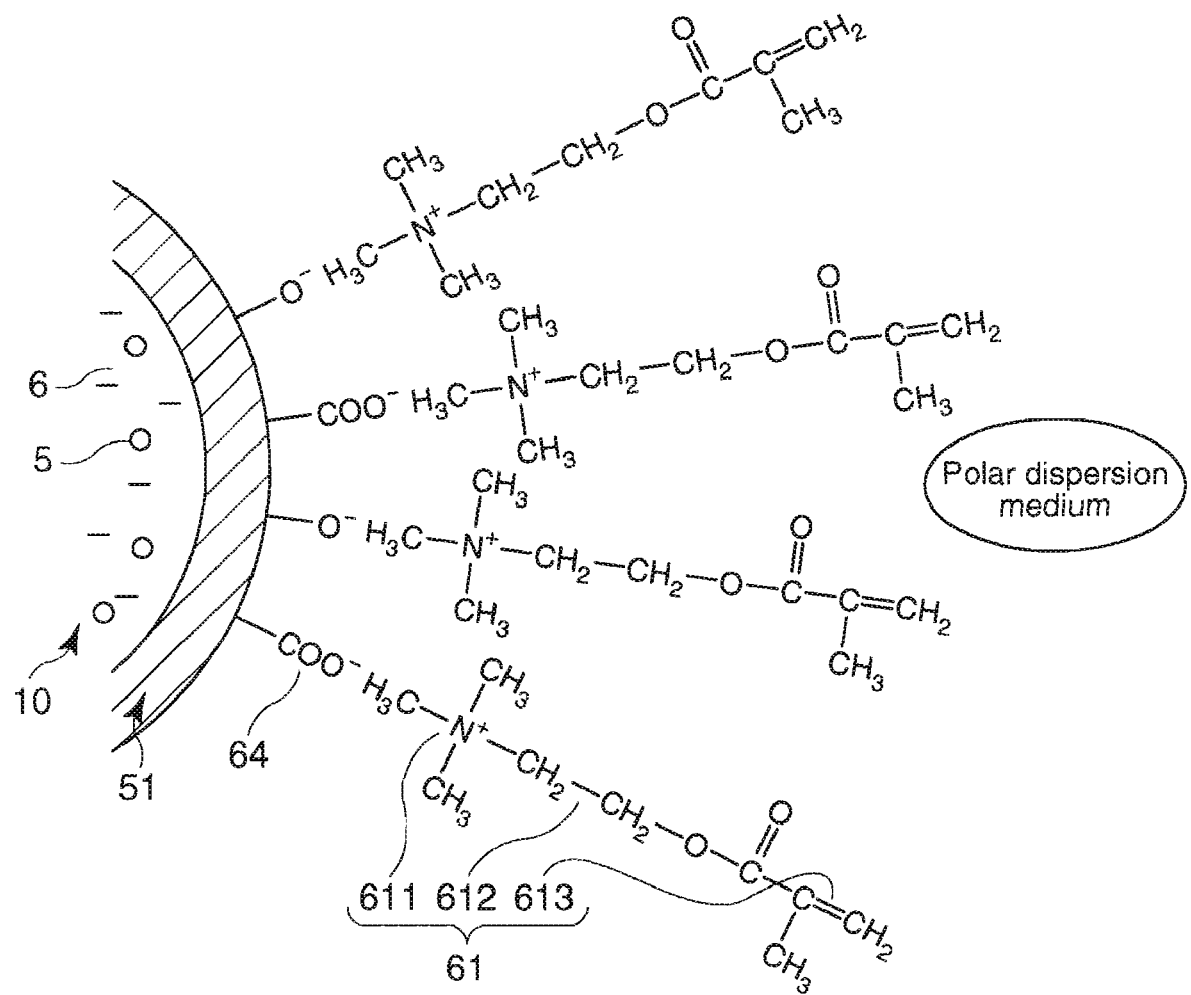
FIG. 16 is a schematic diagram illustrating a configuration of ion pairs formed in an experimental example.

That is, by adding ammonia to water, $H^+$ is drawn out from the COOH group and the OH group existing on the surface of the dispersion liquid encloser, thereby producing an ammonium ion $NH_4^+$. In Formula 39, —$COO^-$ (electric charge 64) and $X^+$ form an ion pair, and $NH_4^+$ and $Cl^-$ form an ion pair. In Formula 40, $O^-$ (electric charge 64) and $X^+$ form an ion pair, and $NH_4^+$ and $Cl^-$ form an ion pair. In the formulas described above, water $H_2O$ is omitted. A schematic diagram illustrating a configuration of the ion pairs is shown in FIG. 16.

4. Methacrylic dimethylamino ethylmethyl chloride is added to the mixture liquid and is emulsified, thereby forming an emulsion liquid.

5. Next, sodium per sulphate ($Na_2S_2O_8$) as a polymerization initiator and TEMED (N,N,N',N'-tetramethylethyl diamine) as a polymerization accelerator are added to the emulsion liquid and are stirred, thereby forming a mixture liquid containing microcapsules in which the dispersion liquid enclosers (first film 51) are coated with organic polymers (second film).

In the mixture liquid, the —O— O— bond in sodium persulphate is disconnected to produce a group and H is drawn out from the TEMED. The TEMED from which H is drawn out becomes a group, which attacks the —C=$CH_2$ bond in $CH_2$=$C(CH_3)COO$— (methacryloyl group) of the methacrylic dimethylamino ethylmethyl chloride salt. Accordingly, unpaired electrons are produced in —C=$CH_2$ of the methacryloyl group to attack the methacryloyl group of the methacrylic dimethyl amino ethylmethyl chloride salt close thereto, thereby causing chain reactions. As a result, an organic polymer (second film) is formed. The condition at that time is a temperature of 170° C., a stirring period of time of 5 hours, and a stirring speed of 1,300 rpm.

6. The microcapsules are filtered and recovered from the mixture liquid. The average diameter of the obtained microcapsules is about 50 µm.

7. The electrophoretic device shown in FIG. 1 is manufactured using the obtained microcapsules. Specifications thereof are as follows.

First substrate and second substrate
    Size: 50 mm×50 mm×100 µm
    Material: polyethylene
First electrode and second electrode
    Size: 40 mm×40 mm×4 µm
    Material: ITO
Binder
    Material: ABS resin Experimental Example 2

Similarly to Experimental Example 1, except that an anionic polymerization surface-active agent expressed by Formula 31a is used instead of the methacrylic dimethylamino ethylmethyl chloride salt in Process 4 described above, microcapsules are obtained and an electrophoretic device is manufactured.

Experimental Example 3

Similarly to Experimental Example 1, except that acrylic ethyl (hydrophobic monomer) as a comonomer is added along with the polymerization surface-active agent and the polymerization initiator in Process 3 described above, microcapsules are obtained and an electrophoretic device is manufactured.

Experimental Example 4

Similarly to Experimental Example 1, except that ethylene glycol diacrylate (cross-linking monomer) and isobornyl methacrylate (monomer expressed by General Formula 1) as a comonomer are added along with the polymerization surface-active agent and the polymerization initiator in Process 3 described above, microcapsules are obtained and an electrophoretic device is manufactured.

COMPARATIVE EXAMPLE

Similarly to Experimental Example 1, except that the microcapsules are obtained by the use of the coacervation method using the gelatin and the gum arabic, an electrophoretic device is manufactured.

2. Test (Moisture-Resistant Test)

The electrophoretic devices according to the experimental examples and the comparative example are placed under the condition of 80° C. and 90% RH for 24 hours.

As a result, the electrophoretic devices according to the experimental examples also operate almost similarly no those after manufacture, even after the moisture-resistant test has been ended.

On the contrary, the electrophoretic device according to the comparative example does not operate after the moisture-resistant test has been ended.

What is claimed is:

1. A microcapsule comprising:
an electrophoretic dispersion liquid including a plurality of electrophoretic particles;
a first film encapsulating the electrophoretic dispersion liquid; and
a second film covering the first film, the second film being an organic polymer including a plurality of polar groups ionically bonded to a plurality of protons, and being more hydrophobic than the first film.

2. The microcapsule according to claim 1, the second film including a plurality of hydrophobic groups, the plurality of polar groups being located between the plurality of hydrophobic groups and the plurality of protons.

3. An electrophoretic device comprising:
a plurality of microcapsules according to claim 1; and
a substrate on which the plurality of microcapsules is disposed.

4. An electric apparatus comprising:
the electrophoretic device according to claim 3; and
a main body section on which the electrophoretic device is disposed.

5. The electrophoretic device according to claim 3, further comprising:
a first electrode;
a second electrode, the first electrode and the second electrode sandwiching the plurality of microcapsules; and
a resin portion formed between the first and second electrode and between the plurality of microcapsules.

6. The microcapsule according to claim 1, the first film including a complex material of gum Arabic and gelatin.

7. The microcapsule according to claim 1, the first film including resin.

8. The microcapsule according to claim 7, the resin being urethane resin.

9. The microcapsule according to claim 7, the resin being melamine resin.

10. A microcapsule comprising:
an electrophoretic dispersion liquid containing an electrophoretic particle:
a first film encapsulating the electrophoretic dispersion liquid; and
a second film covering the first film, the second film being more hydrophobic than the first film, the first film and the second film constituting a capsule body.

11. The microcapsule according to claim 10, wherein the first film has electric charges on the outer surface thereof,
wherein the second film has electric charges on both the inner surface and the outer surface, and
wherein the electric charges on the inner surface of the second film have a polarity opposite to that of the electric charges on the outer surface of the first film.

12. The microcapsule according to claim 11, wherein the second film has a repeated structure unit derived from a polymerization surface-active agent having a polar group having a polarity opposite to that of the electric charges on the outer surface of the first film, a hydrophobic group, and a polymerization group.

13. The microcapsule according to claim 12, wherein the electric charges on the outer surface of the first film are minus charges,
wherein the polar group of the polymerization surface-active agent is a cationic group, and
wherein the cationic group is one selected from a group consisting of a first-degree amine cationic group, a second-degree amine cationic group, a third-degree amine cationic group, and a fourth-degree ammonium cationic group.

14. The microcapsule according to claim 12, wherein the electric charges on the outer surface of the first film are plus charges,
wherein the polar group of the polymerization surface-active agent is an anionic group, and
wherein the anionic group is one selected from a group consisting of a sulfonate anionic group ($-SO_3^-$), a sulfinate anionic group ($-RSO_2^-$, examples of which include an alkyl group, a phenyl group, and degenerative materials thereof having a carbon number of 1 to 12), and a carbonic anionic group ($-COO^-$).

15. The microcapsule according to claim 12, wherein the hydrophobic group of the polymerization surface-active agent includes at least one of an alkyl group and an aryl group.

16. The microcapsule according to claim 12, wherein the polymerization group of the polymerization surface-active agent is a radical-polymerizable unsaturated hydrocarbon group.

17. The microcapsule according to claim 16, wherein the radical-polymerizable unsaturated hydrocarbon group is one selected from a group consisting of a vinyl group, an aryl group, an acryloyl group, a methacryloyl group, a propenyl group, a vinylidene group, and a vinylene group.

18. A method of manufacturing a microcapsule that includes an electrophoretic dispersion liquid, a first film, and a second film, the first film encapsulating the electrophoretic dispersion liquid, the second film covering the first film and being more hydrophobic than the first film, the method comprising:
adding a plurality of polymerization surface-active agents to ionize the plurality of polymerization surface-active agents in a dispersion liquid, the dispersion liquid dispersing the first film that encapsulates the electrophoretic dispersion; and adding a polymerization initiator to the dispersion liquid, a plurality of polymerization groups of the plurality of polymerization surface-active agents reacting to each other to form the second film which covers the first film.

19. The method of manufacturing a microcapsule according to claim 18, each of the polymerization surface-active agents including the polymerization group, a hydrophobic group, and a polar group, the polar group of the polymerization surface-active agents having a negative charge, the polar group being ionically bond to the surface of the first film.

20. A method of manufacturing an electrophoretic device comprising:

forming a plurality of microcapsules, each of the microcapsules being produced by the method according to claim 18; and disposing the plurality of microcapsules on a substrate.

21. A method of manufacturing an electric apparatus comprising:

forming the electrophoretic device that is manufactured by the method according to claim 20; and disposing the electrophoretic device on a main body section.

22. A method of manufacturing a microcapsule, the method comprising:

forming a first film having electric charges on the outer surface thereof by adding a polymerization surface-active agent having a polar group having a polarity opposite to that of the electric charges on the outer surface of the first film, a hydrophobic group, and a polymerization group to an aqueous dispersion liquid in which an electrophoretic dispersion liquid containing at least one kind of electrophoretic particles is dispersed and mixing the polymerization surface-active agent with the aqueous dispersion liquid such that the first film encapsulates the electrophoretic dispersion liquid:

adding and emulsifying the polymerization surface-active agent and/or hydrophilic monomers having a polar group having the polarity opposite to that of the electric charges on the outer surface of the first film to the aqueous dispersion liquid; and forming a second film covering the first film by adding a polymerization initiator to the aqueous dispersion liquid to cause a polymerization reaction, the second film being more hydrophobic than the first film.

23. A method of manufacturing a microcapsule, the method comprising:

forming a first film having electric charges on the outer surface thereof by adding a polymerization surface-active agent having a polar group having a polarity opposite to that of the electric charges on the outer surface of the first film, a hydrophobic group, and a polymerization group to an aqueous dispersion liquid in which an electrophoretic dispersion liquid containing at least one kind of electrophoretic particles is dispersed and mixing the polymerization surface-active agent with the aqueous dispersion liquid such that the first film encapsulates the electrophoretic dispersion liquid:

adding and emulsifying a second polymerization surface-active agent having a polar group having a polarity equal to that of the electric charges on the outer surface of the first film and/or a hydrophilic monomer having a polar group having the polarity equal to that of the electric charges on the outer surface of the first film to the aqueous dispersion liquid; and forming a second film covering the first film by adding a polymerization initiator to the aqueous dispersion liquid to cause a polymerization reaction, the second film being more hydrophobic than the first film.

* * * * *